United States Patent
Kim et al.

(10) Patent No.: US 12,363,422 B2
(45) Date of Patent: Jul. 15, 2025

(54) METHOD AND APPARATUS FOR PROVIDING EDITED IMAGE BASED ON USER PREFERENCE

(71) Applicant: SAMSUNG ELECTRONICS CO., LTD., Suwon-si (KR)

(72) Inventors: Beomsu Kim, Suwon-si (KR); Wonjoon Do, Suwon-si (KR); Jihwan Choe, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 326 days.

(21) Appl. No.: 17/986,834

(22) Filed: Nov. 14, 2022

(65) Prior Publication Data
US 2023/0076342 A1 Mar. 9, 2023

Related U.S. Application Data

(63) Continuation of application No. PCT/KR2021/003435, filed on Mar. 19, 2021.

(30) Foreign Application Priority Data

May 15, 2020 (KR) .......................... 10-2020-0058507

(51) Int. Cl.
*H04N 23/63* (2023.01)
*G06V 20/40* (2022.01)
(Continued)

(52) U.S. Cl.
CPC ........... *H04N 23/632* (2023.01); *G06V 20/41* (2022.01); *H04N 23/61* (2023.01); *H04N 23/64* (2023.01)

(58) Field of Classification Search
CPC ...... H04N 23/632; H04N 23/61; H04N 23/64; H04N 23/60; G06V 20/41; G06V 20/35; G06T 11/60; G06T 7/20; G06F 18/00
(Continued)

(56) References Cited

U.S. PATENT DOCUMENTS 9,412,046 B2 8/2016 Shen et al.
9,589,209 B2 3/2017 Shen et al.
(Continued)

FOREIGN PATENT DOCUMENTS

JP 5156342 B2 3/2013
JP 2015506023 A 2/2015
(Continued)

OTHER PUBLICATIONS

International Search Report and Written Opinion for International Application No. PCT/KR2021/003435; International Filing Date Mar. 19, 2021; Date of Mailing Jun. 22, 2021; 72 Pages.
(Continued)

*Primary Examiner* — Usman A Khan
(74) *Attorney, Agent, or Firm* — CANTOR COLBURN LLP

(57) ABSTRACT

Disclosed in various embodiments of the present disclosure are a method and an apparatus for providing an image in an electronic device. An electronic device according to various embodiments comprises a camera module, a display, a memory, and a processor, where the processor can display a preview image through the display, capture an image at least based on of the preview image in response to a user input while displaying the preview image, perform image analysis based on the captured image, identify at least one class related to the captured image based on the image analysis result, identify at least one user preference based on the identified class, and provide, through the display, at least one
(Continued)

recommended image related to the at least one user preference.

18 Claims, 17 Drawing Sheets

(51) Int. Cl.
   *H04N 23/60* (2023.01)
   *H04N 23/61* (2023.01)
(58) Field of Classification Search
   USPC .......................................................... 348/222.1
   See application file for complete search history.

(56) References Cited

U.S. PATENT DOCUMENTS

| | | | |
|---|---|---|---|
| 2007/0192164 | A1 | 8/2007 | Nong et al. |
| 2010/0088151 | A1 | 4/2010 | Kim et al. |
| 2011/0085739 | A1 | 4/2011 | Zhang |
| 2012/0155759 | A1 | 6/2012 | Kang et al. |
| 2013/0204825 | A1* | 8/2013 | Su .............................. G06N 5/02 |
| | | | 706/46 |
| 2013/0258159 | A1* | 10/2013 | Sakane ................. H04N 23/611 |
| | | | 348/333.02 |
| 2013/0332840 | A1* | 12/2013 | Roth ...................... G06F 3/0481 |
| | | | 715/738 |
| 2014/0176732 | A1 | 1/2014 | Cohen et al. |
| 2014/0036108 | A1 | 2/2014 | Yoon et al. |
| 2014/0294239 | A1 | 10/2014 | Duckett |
| 2015/0086109 | A1 | 3/2015 | Paris et al. |
| 2016/0247044 | A1 | 8/2016 | Shen et al. |
| 2016/0357406 | A1* | 12/2016 | Lee .......................... G06V 10/17 |
| 2017/0048461 | A1* | 2/2017 | Lee ........................ H04N 23/62 |
| 2018/0330199 | A1 | 11/2018 | Nogami et al. |
| 2019/0012556 | A1 | 1/2019 | Eyama |
| 2019/0124272 | A1 | 4/2019 | O'Neill |
| 2019/0238759 | A1* | 8/2019 | Ahn .......................... G06T 5/60 |
| 2019/0279345 | A1 | 9/2019 | Kim et al. |
| 2019/0379837 | A1* | 12/2019 | Kim ....................... H04N 23/62 |
| 2020/0053293 | A1 | 2/2020 | Lee et al. |
| 2021/0185243 | A1 | 6/2021 | Park et al. |

FOREIGN PATENT DOCUMENTS

| | | |
|---|---|---|
| JP | 5774985 B2 | 9/2015 |
| JP | 2018194938 A | 12/2018 |
| JP | 2019016268 A | 1/2019 |
| KR | 100824829 B1 | 4/2008 |
| KR | 20140018686 A | 2/2014 |
| KR | 20150087362 A | 7/2015 |
| KR | 101590515 B1 | 2/2016 |
| KR | 20170086751 A | 7/2017 |
| KR | 20190058847 A | 5/2019 |
| KR | 20190092995 A | 8/2019 |
| KR | 20190129435 A | 11/2019 |
| KR | 20190139062 A | 12/2019 |
| KR | 20200017310 A | 2/2020 |
| KR | 20200051540 A | 5/2020 |

OTHER PUBLICATIONS

European Office Action corresponding to Application No. 21804845.2-1208, Dated Mar. 22, 2024.
Korean Office Action corresponding to Application No. 10-2020-0058507; Dated Mar. 28, 2024.
Extended European Search Report dated Aug. 4, 2023, corresponding to Application No. 2180485.2-1208; pp. 10.
European Second Office Action corresponding to Application No. 21804845.2-1207; Dated Oct. 23, 2024.

* cited by examiner 1210
rule of thirds 1220
center 1230
horizontal 1240
symmetric 1250
diagonal 1260
curved 1270
vertical 1280
triangle 1290
pattern

METHOD AND APPARATUS FOR PROVIDING EDITED IMAGE BASED ON USER PREFERENCE

CROSS-REFERENCE TO RELATED APPLICATIONS

This application is a continuation of International Application No. PCT/KR2021/003435 designating the United States, filed on Mar. 19, 2021, in the Korean Intellectual Property Receiving Office and claiming priority to Korean Patent Application No. 10-2020-0058507, filed on May 15, 2020, in the Korean Intellectual Property Office, the disclosures of which are incorporated by reference herein in their entireties.

TECHNICAL FIELD

Various embodiments of the present disclosure relate to a method and apparatus for providing an image in an electronic device.

BACKGROUND ART

Recently, an electronic device having a camera function (e.g., a mobile communication terminal, a smart-phone, a tablet personal computer, a notebook computer, and/or a digital camera) has become popular. Accordingly, the frequency of a user taking an image (e.g., a still image, a moving image) in daily life by using an electronic device is increasing. For example, according to the spread of electronic devices, most users may carry a camera in their daily life, and may capture an image regardless of space and/or time.

A user can capture images of various subjects (e.g., class or category) in various ways. The user may capture after pre-calibration (e.g., editing such as changing an image filter, color tone curve, contrast, brightness, sharpness, crop, and/or rotation) such as configurating various options of the camera function (e.g., configuring using a configuration menu) according to the subject to be captured when capturing an image. Alternatively, the user may use various editing tools to post-calibrate (e.g., edit such as changing an image filter, color tone curve, contrast, brightness, sharpness, crop, and/or rotation) the captured image, based on the corresponding subject and user preference. For example, the image captured by the user may be edited in various ways using an electronic device.

As described above, the user edits the image according to the user's own preference when capturing the image or after capturing the image. For example, the user may edit the image according to the user's preference through pre-calibration or post-calibration every time an image is captured.

DISCLOSURE OF INVENTION

Technical Problem

Editing elements to obtain a final result according to the user's preference may vary depending on the subject (or content) of the video. In addition, the user may edit the image with mostly the same or similar editing elements according to the subject of the image. However, it is inconvenient for a user to repeatedly perform an editing operation each time in order to obtain a final result corresponding to the user's preference when capturing an image or after capturing the image. For example, as an image editing operation of the same or similar pattern is repeatedly performed during or after capturing an image for the capturing result according to the user's preference, repeated work and time for image editing may be required.

Technical Solution

In various embodiments, disclosed are a method and an apparatus capable of analyzing and processing a user's preference for an image in an electronic device (or on-device), based on a user's usual pattern without direct interaction of the user.

In various embodiments, disclosed are a method and an apparatus capable of automatically providing a recommended video edited to correspond to user preference when taking an image.

In various embodiments, disclosed are a method and an apparatus capable of providing a recommended image, based on user preference related to the captured image using a learning model learned using an artificial intelligent (AI) network (or algorithm, system), and analyzing and processing user preferences therefor.

In various embodiments, disclosed are a method and an apparatus capable of automatically analyzing the user's image preference in the background to generate user preference by class (or subject) of the image, based on the user's image editing and/or capturing option configuring change in the electronic device, and providing a recommended video to which an editing element, based on user preference is applied (or automatically edited) when capturing a video.

The technical problems to be addressed in the present disclosure are not limited to the technical problems mentioned above, and another technical problem not mentioned will be clearly understood by those of ordinary skill in the art to which the present invention belongs from the following description.

An electronic device, according to an embodiment of the present disclosure, includes a camera module, a display, a memory, and a processor operatively coupled to the camera module, the display, and the memory, where the processor is configured to display a preview image through the display, capture an image at least based on the preview image, based on a user input while displaying the preview image, perform image analysis, based on the captured image, identify at least one class related to the captured image, based on the result of image analysis, identify at least one user preference, based on the identified class, and provide at least one recommended image related to the at least one user preference through the display.

An electronic device, according to an embodiment of the present disclosure, includes a camera module, a display, a memory, and a processor operatively coupled to the camera module, the display, and the memory, where the memory stores instructions to cause, when executed, the processor to detect an image editing trigger related to image editing in the electronic device, to perform image analysis of a corresponding image, based on the image editing trigger, to classify a class related to the image, based on a result of the image analysis, to estimate at least one editing element used for editing the image according to the image editing trigger, and to update at least one user preference in a database, based at least on the classified class and the estimated editing element.

An operation method of an electronic device, according to an embodiment of the present disclosure, includes displaying a preview image through a display of the electronic device, capturing an image, based on at least the preview image, based on a user input while the preview image is displayed, performing image analysis, based on the captured image, identifying at least one class related to the captured image, based on a result of image analysis, identifying at least one user preference, based on the identified class, and providing at least one recommended image related to the at least one user preference through the display.

In various embodiments of the present disclosure to solve the above problems, a non-transitory computer-readable storage medium storing instructions that, when executed by a processor, cause the processor to perform the operating method of the electronic device.

Further scope of applicability of the present disclosure will become apparent from the following detailed description. However, it should be understood that the detailed description and specific embodiments, such as preferred embodiments of the present disclosure, are given by way of example only, since various changes and modifications within the spirit and scope of the present disclosure may be clearly understood by those skilled in the art.

Advantageous Effects of Invention

According to an electronic device and an operating method thereof according to various embodiments, it is possible to analyze the user's preference for the image in the electronic device (or on device), based on the user's usual pattern without direct user interaction, and to automatically recommend an edited image, based on the user's preference when the user captures an image.

According to an embodiment, the electronic device may analyze various edit elements created (or edited) by a user in the electronic device, and may store and/or manage it in a memory (e.g., a database) in the electronic device in analyzing user preferences, instead of transmitting a user's image (e.g., photo) containing personal information to an external device (e.g., cloud, social network, or another electronic device).

According to an embodiment, when a user captures an image, the electronic device may automatically identify the class (or subject, content) of the captured image and recommend an edited (e.g., pre-corrected) image with an editing element corresponding to the user's preference to provide both the original image and the recommended image to the user.

According to an embodiment, the electronic device may automatically analyze in the background without an interaction to directly select the user preference and/or intention to the user. For example, when a user edits an image (e.g., post-calibration) or performs shooting by using a specific camera setting value (e.g., applying an image filter) (e.g., pre-calibration), the electronic device may automatically analyze the editing element used by the user for editing in the background, and may generate the user preference in the class of the corresponding image.

According to an embodiment, the electronic device may store user preferences in a database, and may call an editing element corresponding to the user's preference from the database and automatically provide the user with the recommended image in consideration of the user's preference, when capturing an image. Through this, the user can check and obtain the final result corresponding to the user preference (e.g., an image edited with the editing element of the user preference) without editing operations, such as pre-calibration and/or post-calibration of the image.

BRIEF DESCRIPTION OF DRAWINGS

In connection with the drawings, the same or similar reference numerals may be used for the same or similar components.

MODE FOR THE INVENTION

Figure 1:
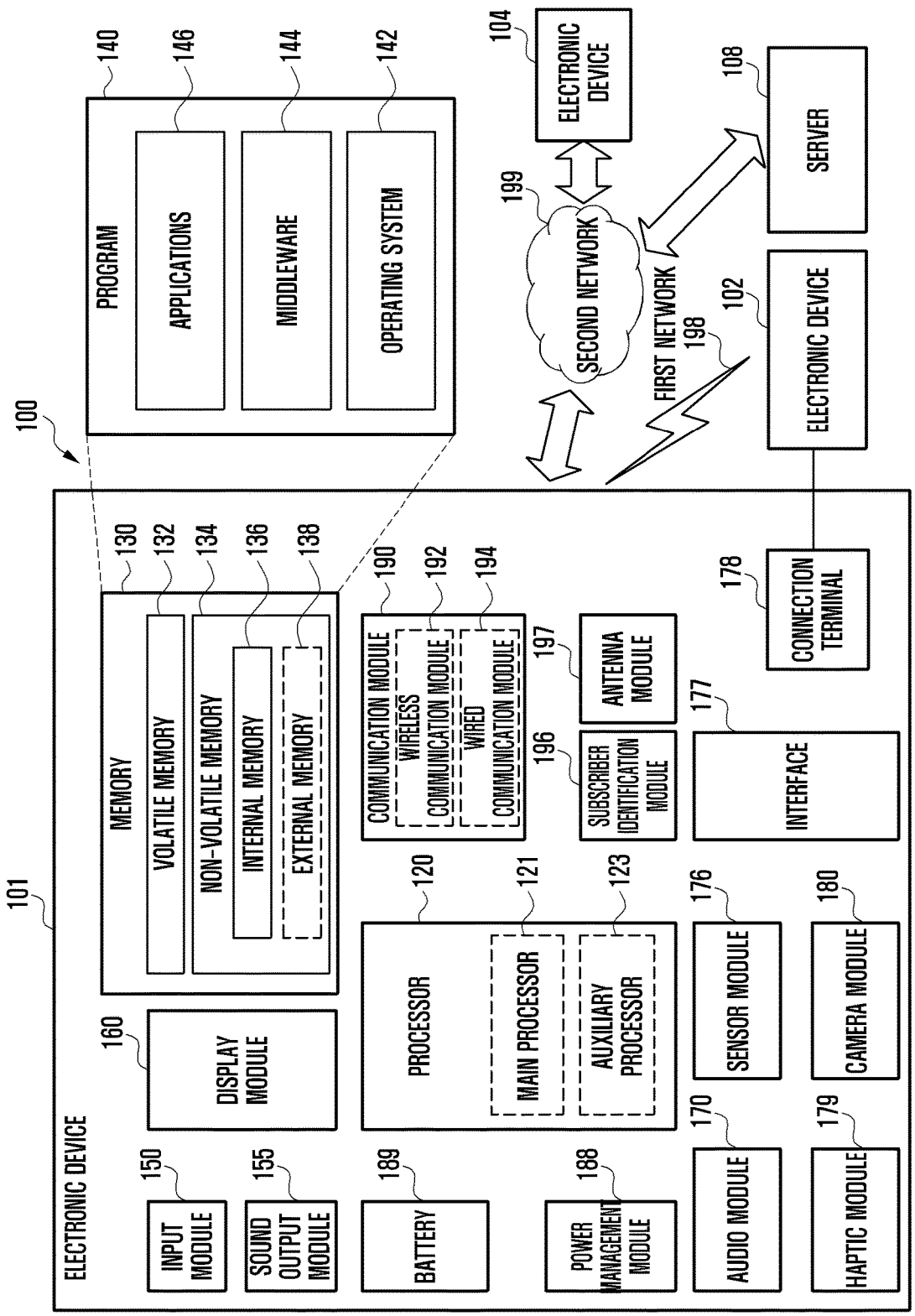
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
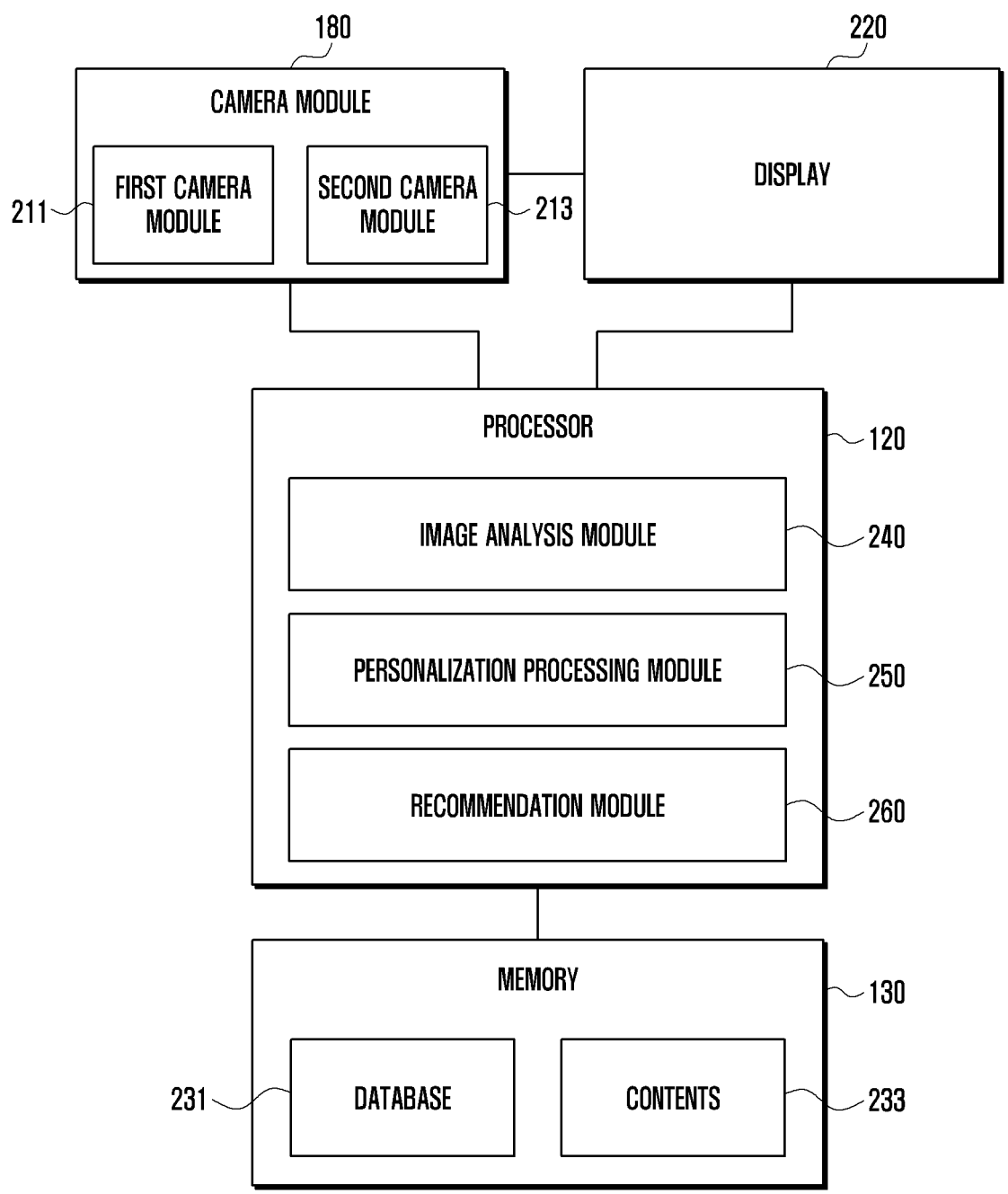
FIG. 2 is a diagram schematically illustrating a configuration of an electronic device according to various embodiments.

FIG. 2 is a diagram schematically illustrating a configuration of an electronic device according to various embodiments.

FIG. 2 shows an example of a configuration related to providing an image, based on user preference in the electronic device 101 of FIG. 1 according to various embodiments. According to an embodiment, the electronic device 101 may include various types of devices having a camera function. For example, the electronic device 101 may include a mobile communication terminal, a smart phone, a tablet personal computer (PC), a notebook computer, and/or a digital camera.

Referring to FIG. 2, the electronic device 101 according to an embodiment may include a camera module 180, a display 220 (e.g., the display module 160 of FIG. 1), a memory 130, and a processor 120.

According to an embodiment, the camera module 180 may capture a still image and/or a moving image. According to an embodiment, the camera module 180 may include one or more lenses, image sensors, image signal processors, or flashes. According to an embodiment, the camera module 180 may include at least one first camera module 211 (e.g., a front camera module) disposed on a first surface (e.g., a front surface, a surface substantially the same as a surface on which the display 220 is disposed) of the housing of the electronic device 101 and at least one second camera module 213 (e.g., a rear camera module) disposed on a second surface of the housing (e.g., a rear surface, a surface opposite to the surface on which the display 220 is disposed). According to an embodiment, the housing may include a first surface facing a first direction (e.g., a front direction) and a second surface facing a second direction (e.g., a rear direction) opposite to the first surface.

According to an embodiment, the display 220 may visually provide information to the outside of the electronic device 101 (e.g., a user). According to an embodiment, the display 220 may include a touch circuit (or a touch sensor) (not shown), and may measure a change in a signal (e.g., voltage, amount of light, resistance, and/or amount of charge) for a specific position of the display 220, based on the touch circuit to detect a touch input and/or a hovering input (or a proximity input).

According to an embodiment, the display 220 may visually provide various information related to a user using (e.g., capturing, editing, and/or sharing) an image under the control of the processor 120. For example, the display 220 may provide (e.g., display) an execution screen of an application (e.g., a camera application) including a user interface related to image capturing, an image (e.g., a preview image) obtained through the camera module 180, an editing screen including a recommended image, based on user preference, a content 233 (e.g., a stored image) stored in the memory 130, and/or an editing screen including an image editing tool.

According to an embodiment, the memory 130 may store various data used by at least one component of the electronic device 101 (e.g., the processor 120 or the camera module 180). The data may include, for example, input data or output data for software (e.g., the program 140) and instructions related thereto. According to an embodiment, the memory 130 may store a database 231 and content 233 (e.g., an image) related to user preferences. According to an embodiment, the database 231 may store user preferences for each class (or subject, content) of an image as a database. For example, the database 231 may classify images into various classes and may include at least one cluster (or an editing element group divided into similar editing elements) for each of the various classes. In an embodiment, the at least one cluster may include at least one user preference, each of which includes at least one editing element. It is described in detail with reference to the figures described below in relation to editing elements, user preferences, clusters, and/or database 231 according to various embodiments.

According to an embodiment, the processor 120 may process an operation related to providing (or applying) a personalized image (e.g., a recommended image) according to a user's preference when capturing an image of the user. According to an embodiment, the processor 120 may extract a user preference, based on a corresponding edit element in the background and create a database, based on the user editing the video and/or changing the capturing option configuring value (e.g., brightness, sensitivity, or white balance) when capturing the video. According to an embodiment, when the user's image is captured, the processor 120 may generate at least one recommended image edited (or personalized) of the captured image as an editing element of user preference and provide it to the user (e.g., displayed on the display 220), based on the image analysis, based on the user preference corresponding to the image. According to an embodiment, the processor 120 may update the user preference related to the recommended image, based on the user's selection of the recommended image. For example, the processor 120 may count (or increase, accumulate) the number of times of use (or compensation, weight) of the corresponding user preference.

According to an embodiment, the processor 120 may include an image analysis module 240 and/or a personalization processing module 250.

In an embodiment, the image analysis module 240 may perform image analysis, based on a specified image. According to an embodiment, the image analysis module 240 may perform image analysis, based at least on an analysis algorithm (or learning algorithm) such as a scene classifier, object detection, and/or composition detection of an image. According to an embodiment, the image analysis module 240 may analyze whether the image contains specific objects (e.g., people, animals, or objects (e.g., food, flowers, cars, buildings)), landscapes (e.g., mountains, seas, rivers, fields, or cities), and/or whether a portrait, a half-body shot (or a close-up shot), or a full-body shot is included, based on at least one analysis algorithm.

According to an embodiment, the image analysis module 240 may identify a class related to an image, based on a result of image analysis. According to an embodiment, the class may collectively refer to various classes used to classify the content of an image, such as face, baby, person, dog, cat, food, people, beaches, sky, mountain, sunset, sunrise, city, snow, waterfall, watersides, scenery, stage, vehicles, drinks, flowers, trees, greenery, animal, shoes, backlit, indoor, text, clothes, and/or night view. According to an embodiment, the image analysis module 240 may determine at least one class to which an image belongs among various classified classes. According to an embodiment, the image analysis module 240 may extract a feature vector from an image captured by the user. For example, the feature vector may be for classifying a class of an image, and may be a feature of a deep neural network or a type of a classified class.

In an embodiment, the personalization processing module 250 may automatically provide (or recommend) an image (e.g., a recommended image) that matches the user's preference when the user shoots an image. According to an embodiment, the personalization processing module 250 may identify a user preference based at least on the determined class. According to an embodiment, the personalization processing module 250 may call at least one user preference defined in (or included in) the determined class from the database 231 stored in the memory 130 and identify the called user preference. According to an embodiment, the user preference may include at least one editing element related to editing of an image. According to an embodiment, the editing element may include at least one piece of information related to brightness, tone curve, color curve, contrast, crop, saturation, sharpness, magnify, composition, image filter, rotation, and/or human area (e.g., editing information or configuring information).

According to an embodiment, the personalization processing module 250 may classify a class of an image in a database, based on the feature vector, call a user preference (e.g., an editing element) stored in the classified class, and provide a recommended image. According to an embodiment, in the case of a class in which the user's preference is not sufficiently learned, the expert's editing element stored for the class may be obtained (or requested and received) from the outside (e.g., cloud) and provided. According to an embodiment, the personalization processing module 250 may provide (or recommend) a recommended image to the user by applying an editing element of user preference called from the database 231 to the original image. According to an embodiment, the personalization processing module 250 may update the corresponding user preference by adding the selected information back to the database 231, based on the recommended image selected by the user from among the provided recommended images.

According to an embodiment, the processor 120 may automatically analyze user preferences and/or intentions. For example, the processor 120 may automatically analyze user preferences and/or intentions in the background without direct user interaction, allowing the user to directly select. According to an embodiment, the processor 120 may analyze in the background that a user edits an image using a built-in editing application (or an editing tool) or captures an image by applying a specific filter using a capturing-related application to be stored in the database 231 of the electronic device 101.

An electronic device 101 according to various embodiments of the present disclosure may include a camera module 180, a display 220 (or a display module 160 of FIG. 1), a memory 130, and a processor 120 operatively coupled to the camera module 180, the display 220, and the memory 130, wherein the processor 120 may display a preview image through the display 220, capture an image at least based on the preview image, based on a user input while displaying the preview image, perform image analysis, based on the captured image, identify at least one class related to the captured image, based on the result of image analysis, identify at least one user preference, based on the identified class, and provide at least one recommended image related to the at least one user preference through the display 220.

According to various embodiments of the present disclosure, the user preference may include at least one editing element related to editing of an image.

According to various embodiments of the present disclosure, the processor 120 may analyze an image, based on at least one image analysis algorithm of a scene classifier, object detection, and/or composition detection of the image.

According to various embodiments of the present disclosure, the processor 120 may perform the image analysis, based on at least the preview image and/or the captured image in the background at the time of capturing the image.

According to various embodiments of the present disclosure, the processor 120 may provide the captured image through a first designated area of the display 220, and provide the at least one recommended image through a second designated area of the display 220.

According to various embodiments of the present disclosure, the processor 120 may provide one or more recommended images, based on the identified at least one class and at least one user preference clustered in the at least one class.

According to various embodiments of the present disclosure, the recommended images may include images edited with editing elements of different user preferences belonging to the same class and/or images edited with editing elements of different user preferences belonging to different classes.

According to various embodiments of the present disclosure, the processor 120 may extract feature vectors by analyzing the contents of the image, classify the class of the image, based on the extracted feature vector, and call the user preference stored in the classified class to provide the recommended image.

According to various embodiments of the present disclosure, the memory 130 may store a database 231 and 700 (FIG. 7) in which at least one user preference is tracked for each of various classes related to an image.

According to various embodiments of the present disclosure, the processor 120 may update the corresponding user preference in the selected recommended image class, based on detecting the selection of the recommended image.

According to various embodiments of the present disclosure, the processor 120 may count the number of times of use of the user preference related to the selected recommended image, in the class.

According to various embodiments of the present disclosure, the processor 120 may apply the editing elements of the selected recommended video to the captured video, based on detecting the selection of the recommended image, and store the captured image and the selected recommended image in association with each other.

According to various embodiments of the present disclosure, the processor 120 may update a user preference according to the editing element to a corresponding class when an editing element is configured when the image is taken.

According to various embodiments of the present disclosure, the processor 120 may count the number of times the user preference is used when there is a user preference corresponding to the edit element, in the class, and generate a new user preference, based on the editing element when there is no user preference corresponding to the editing element in the corresponding class.

According to various embodiments of the present disclosure, the processor 120 may perform video analysis, based on video editing triggers related to video editing, classify a class related to an image, based on the result of the image analysis, estimate at least one editing element used for editing the video according to the video editing trigger, and update at least one user preference in a database, based at least on the classified class and the estimated editing element.

According to various embodiments of the present disclosure, the processor 120 may predict the user preference expected to be executed by the user using a learning model learned using an artificial intelligence algorithm.

According to various embodiments of the present disclosure, the processor 120 may predict user preferences that users are expected to execute using a learning model learned using at least one of machine learning, neural network, genetic, deep learning, or classification algorithm, as the artificial intelligence algorithm.

An electronic device 101, according to various embodiments of the present disclosure, may include a camera module 180, a display 220 (or a display module 160 of FIG. 1), a memory 130, and a processor 120 operatively coupled to the camera module 180, the display 220, and the memory 130, and the memory 130 may store instructions that, when executed, causes the processor 120, in the electronic device 101, to: detect an image editing trigger related to image editing, perform image analysis of a corresponding image, based on the image editing trigger, classify a class related to the image, based on a result of the image analysis, estimate at least one editing element used for editing the video according to the video editing trigger, and update at least one user preference in a database 231 and 700, based at least on the classified class and the estimated editing element.

According to various embodiments of the present disclosure, the image editing trigger may include image editing using an editing tool for image editing, capturing configurations while performing capturing, and/or external sharing of the image.

Hereinafter, a method of operating the electronic device 101 according to various embodiments will be described in detail. According to various embodiments, operations performed by the electronic device 101 to be described below may be executed by the processor 120 including at least one processing circuit of the electronic device 101. According to an embodiment, the operations performed by the electronic device 101 may be stored in the memory 130 and, when executed, may be executed by instructions that cause the processor 120 to operate.

According to various embodiments, the electronic device 101 may include a camera module 180, a display 220 (or a display module 160 of FIG. 1), a memory 130, and a processor 120 operatively coupled to the camera module 180, the display 220, and the memory 130. According to various embodiments, the processor 120 may predict user preferences that the user is expected to execute (e.g., select) by using a learning model learned using an artificial intelligence (AI) algorithm, and may perform an operation related to providing a user preference and/or a recommended image. According to one embodiment, the processor 120 may predict a user preference that is expected to be executed (e.g., select) by the user using an artificial intelligence algorithm, for example, at least one of machine learning, neural network, genetic, deep learning, or classification algorithm, and may perform an operation related to providing the user preference and a recommended image.

Figure 3:
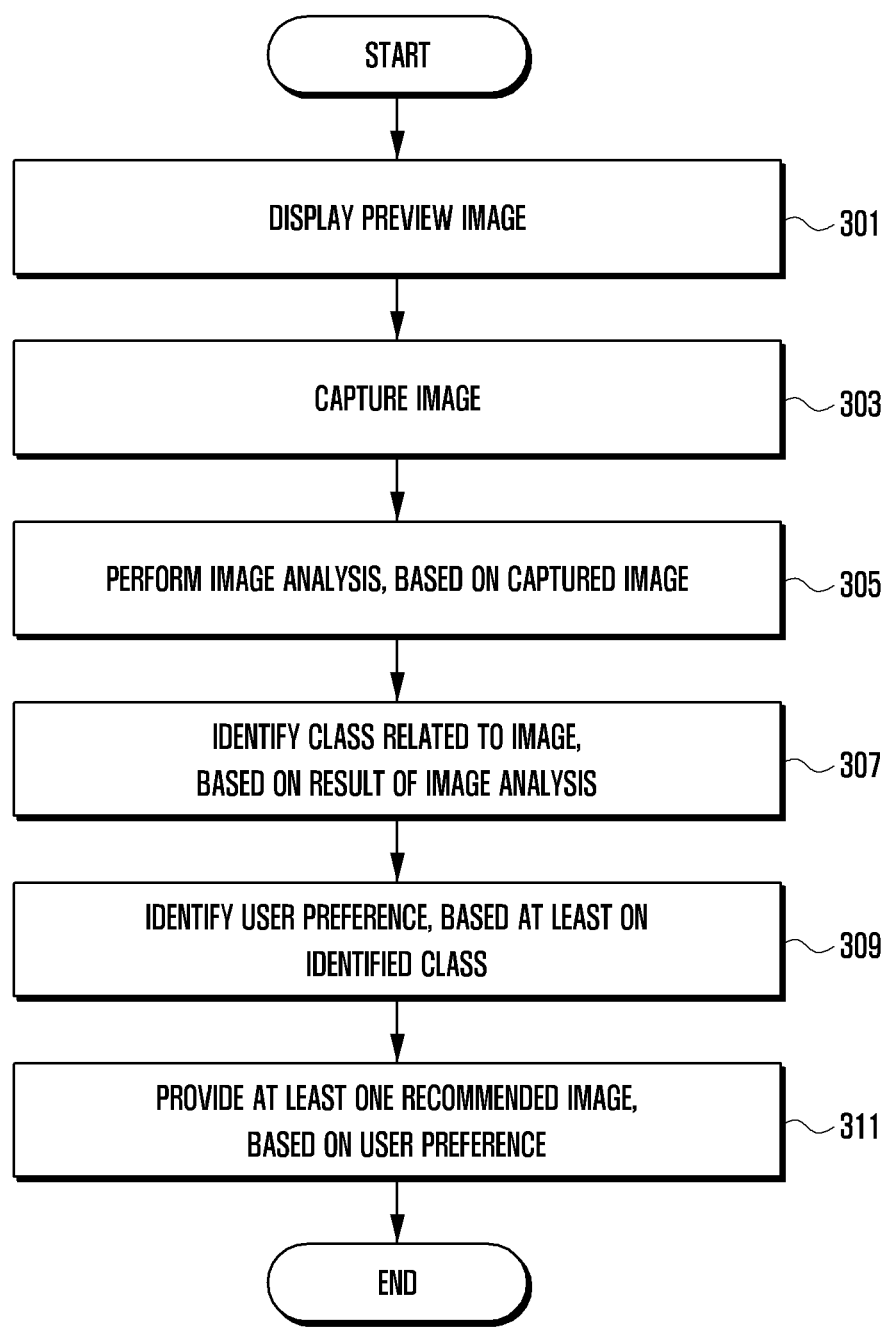
FIG. 3 is a flowchart illustrating an operation of an electronic device according to various embodiments.

FIG. 3 is a flowchart illustrating an operation of an electronic device according to various embodiments.

Referring to FIG. 3, in operation 301, a processor 120 of the electronic device 101 may display a preview image on display 220. According to an embodiment, a user may operate the electronic device 101 to drive a camera module 180 to capture an image. For example, the user may select (e.g., touch) an application (e.g., a camera application) related to a camera function installed in the electronic device 101 and execute the application. According to an embodiment, the processor 120 may obtain a preview image from the camera module 180 when detecting driving (or execution of an application) of the camera module 180. According to an embodiment, the processor 120 may control a display 220 to display a preview image obtained from the camera module 180. According to an embodiment, the processor 120 may provide preview images and various objects related to capturing, such as capturing objects (or capturing buttons, capturing icons) for performing video capturing, and a configuration object (or configuration button, configuration icon) for configuring capturing-related functions (e.g., configuring brightness, sensitivity, and/or white balance) in the user interface associated with the application (e.g. the launch screen).

In operation 303, the processor 120 may capture an image, based on a user input. For example, while displaying the preview image through the display 220, the processor 120 may detect a capturing operation, based on a user input of selecting (e.g., touching) a capturing object, and/or a user input of a motion (or gesture) configured to execute a capturing operation (e.g., detecting a designated hand shape through the camera module 180). According to an embodiment, the processor 120 may perform capturing (or shooting), at least based on a preview image being displayed through the display 220, based on a user input.

In operation 305, the processor 120 may perform image analysis, based on the captured image. According to an embodiment, the processor 120 may perform image analysis, based at least on an analysis algorithm such as a scene classifier, object detection, and/or composition detection of a captured image. According to an embodiment, the processor 120 may identify whether the image contains a specific object (e.g., a person, animal, or object (e.g., food, flower, car, building)), whether the image contains a landscape (e.g., a mountain, sea, river, field, or city), and/or whether the image includes a portrait, a half-body shot (or a close-up shot), or a whole body shot, based on at least one analysis algorithm.

In operation 307, the processor 120 may identify a class related to an image, based on a result of image analysis. According to an embodiment, the class may be classified in various ways, such as face, baby, person, dog, cat, food, people, beaches, sky, mountain, sunset, sunrise, city, snow, waterfall, watersides, scenery, stage, vehicles, drinks, flowers, trees, greenery, animal, shoes, backlit, indoor, text, clothes, and/or night view. According to an embodiment, the processor 120 may determine at least one class to which an image belongs among various classified classes. For example, according to a result of image analysis, one or more classes related to an image may be included.

In operation 309, the processor 120 may identify a user preference based at least on the identified class. According to an embodiment, the processor 120 may call at least one user preference defined in (or included in) the identified class from the database stored in the memory 130, and may identify the called user preference. According to an embodiment, the user preference may include at least one editing element related to editing of an image. According to an embodiment, the editing element may include at least one piece of information related to brightness, tone curve, color curve, contrast, crop, saturation, sharpness, magnify, composition, image filter, rotation, and/or human area (e.g., editing information or configuration information).

In operation 311, the processor 120 may provide at least one recommended image, based on user preference. According to an embodiment, the processor 120 may provide at least one recommended image, based on a designated area of the display 220. According to an embodiment, the processor 120 may control the display 220 to display a captured image (e.g., an original image) and at least one recommended image together. In various embodiments, providing a recommended video will be described with reference to drawings to be described later.

Figure 4:
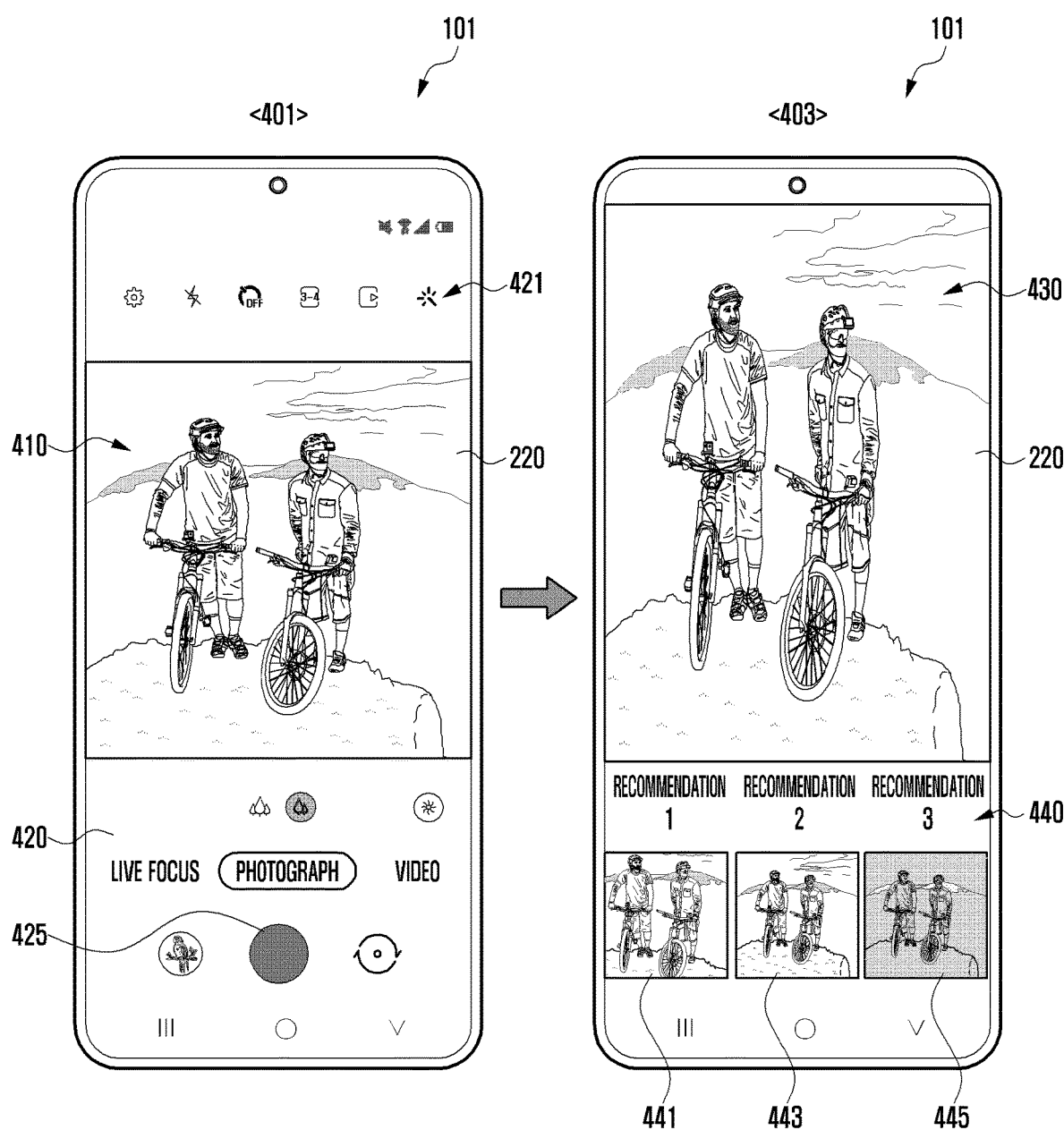
FIG. 4 is a diagram illustrating an example of providing a recommended image in an electronic device according to various embodiments.

FIG. 4 is a diagram illustrating an example of providing a recommended image in an electronic device according to various embodiments.

As shown in FIG. 4, FIG. 4 shows an example of a screen for providing a recommended image related to an image captured by a user.

Referring to FIG. 4, in Example 401, the user may execute an application (e.g., a camera application) of an electronic device 101 to capture an image. According to an embodiment, the electronic device 101 may drive the camera module 180 (e.g., a front camera and/or a rear camera) in response to application execution, and display the preview image 410 obtained from the camera module 180 through the display 220. According to an embodiment, in response to the execution of the application, the electronic device 101 may provide a user interface (e.g., an execution screen) related to an application including a preview image 410 and various objects 420 related to capturing (e.g., configuration objects (or configuration icons) 421 for configuration functions related to capturing (e.g., configuration brightness, sensitivity, or white balance) and a capturing object 425 for capturing an image).

According to an embodiment, the electronic device 101 may provide a layout for the camera module 180 and/or various objects 420 associated with the preview image 410 together with the preview image 410 through at least one designated area of the display 220. According to some embodiments, the layouts related to the various objects 420 may be provided by overlapping (overlay or overlap) on the preview image 410.

According to an embodiment, the user may perform capturing, based on a user input of selecting (e.g., touching) the capturing object 425 or a user input of a specified motion (or gesture) (e.g., recognition of a specified hand shape through the camera module 180).

According to an embodiment, the electronic device 101 may capture an image, based on the preview image 410, based on a user input. According to an embodiment, the electronic device 101 may provide the captured image 430 through the display 220. For example, as shown in Example 403, the electronic device 101 may provide the captured image 430 through a designated area of the display 220.

According to an embodiment, the electronic device 101 may perform image analysis, based on the captured image 430 (e.g., an image recorded in a specified buffer (e.g., a buffer for receiving an image obtained from the camera module 180 and providing an image for the display 220)), in the background, at the time of capturing the video (e.g., at the time of detecting user input for capturing) and/or thereafter. According to some embodiments, the electronic device 101 may perform image analysis using the preview image 410. According to an embodiment, the electronic device 101 may perform image analysis, based on at least various analysis algorithms, such as scene (or image) classification of a captured image, object detection, and/or composition detection.

According to an embodiment, the electronic device 101 may identify a class (or subject) related to an image, based on a result of image analysis. According to an embodiment, the class may be classified in various ways such as face, baby, person, dog, cat, food, people, beaches, sky, mountain, sunset, sunrise, city, snow, waterfall, watersides, scenery, stage, vehicles, drinks, flowers, trees, greenery, animal, shoes, backlit, indoor, text, clothes, and/or night view. According to an embodiment, the electronic device 101 may determine at least one class to which an image belongs among various classes. According to an embodiment, one or more classes related to an image may be included.

According to an embodiment, the electronic device 101 may identify a user preference based at least on the identified class. According to an embodiment, the user preference may include at least one editing element related to editing of an image. According to an embodiment, the editing element may include at least one piece of information related to brightness, tone curve, color curve, contrast, crop, saturation, sharpness, magnify, composition, and/or human area (e.g., editing information or configuring information).

According to an embodiment, the electronic device 101 may provide at least one recommended image 440, based on user preference. According to an embodiment, the electronic device 101 may provide at least one recommended image, based on a designated area of the display 220. According to an embodiment, the electronic device 101 may provide the captured image 430 (e.g., an original image) through a first designated area, and provide at least one recommended image 440 through a second designated area.

According to an embodiment, one or more recommended images 440 may be recommended for at least one class identified based on the result of image analysis, and at least one user preference clustered in at least one class. For example, in Example 403, a first recommended image 441, a second recommended image 443, and a third recommended image 445 may be images edited to have different user preferences belonging to the same class.

For another example, in Example 403, the first recommended image 441, the second recommended image 443, and the third recommended image 445 may be images edited to have different user preferences belonging to different classes, respectively. According to an embodiment, the first recommended image 441 may be an image edited with an editing element of the first user preference of the first class, the second recommended image 443 may be an image edited with the editing element of the second user preference of the second class, and the third recommended image 445 may be an image edited with an editing element of a third user preference of the third class. According to an embodiment, in Example 403, three recommended images are provided for explanation as an example, but the recommended images 440 may include various numbers according to the identified class and user preference.

According to an embodiment, when the electronic device 101 provides the recommended image 440 (e.g., the first recommended image 441, the second recommended image 443, or the third recommended image 445) through the display 220, the electronic device 101 may provide the captured image 430 to a designated area of the display 220 in the form of a thumbnail image. In addition, according to an embodiment, the electronic device 101 may provide a recommended image 440 (e.g., a first recommended image 441, a second recommended image 443, or a third recommended image 445) on the screen display area (e.g., the front side) of the display 220, and may sequentially provide (e.g., display) recommended images, based on a user input (e.g., swipe).

According to an embodiment, in a state as in Example 403, the electronic device 101 may store at least one of a captured image 430 (e.g., an original image) and/or a recommended image 440, based on a user input. For example, the user may select the captured image 430 as a final result, or may select at least one of the recommended images 440. According to an embodiment, when the recommended image 440 is selected, the electronic device 101 may store the captured image 430 and the selected recommended image 440 together and manage them as related images.

Figure 5:
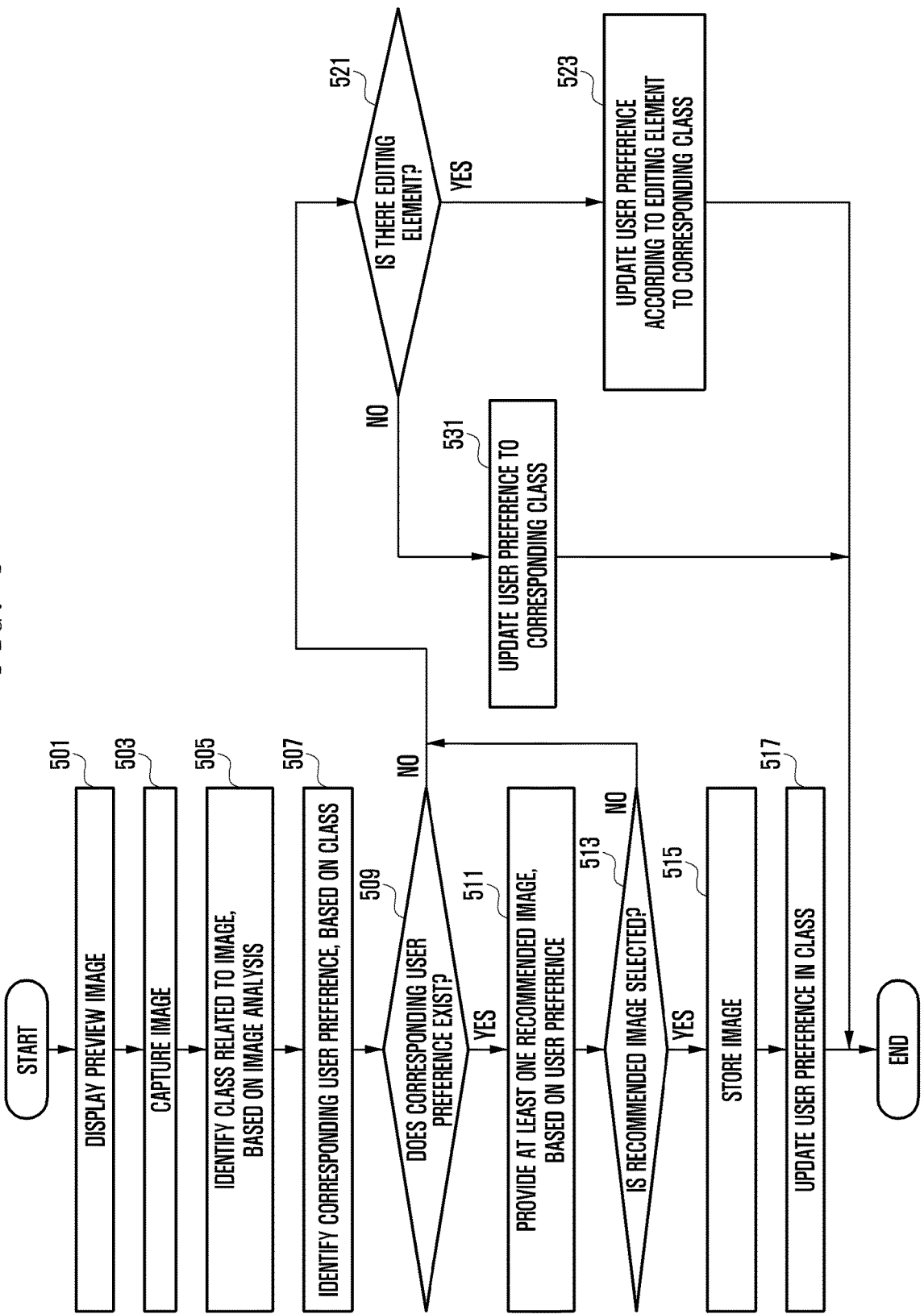
FIG. 5 is a flowchart illustrating an operation of capturing, based on a user preference and updating the user preference in an electronic device according to various embodiments.

FIG. 5 is a flowchart illustrating an operation of capturing, based on a user preference and updating the user preference in an electronic device according to various embodiments.

Referring to FIG. 5, in operation 501, the processor 120 of the electronic device 101 may display a preview image. According to an embodiment, the processor 120 may control the display 220 to display a preview image, such as preview image 410, obtained from the camera module 180. According to an embodiment, the processor 120 may include and provide a preview image and various objects related to capturing (e.g., a capturing object (or capturing button) for performing image capturing) on the user interface (e.g., execution screen) related to the application, and a configuring object for configuring a function related to capturing.

In operation 503, the processor 120 may capture an image, based on a user input. For example, while displaying a preview image through the display 220, the processor 120 may detect a capturing operation, based on a user input of selecting (e.g., touching) a capturing object and/or a user input of a motion (or gesture) configured to execute the capturing operation. According to an embodiment, the processor 120 may perform capturing (or shooting), based on at least a preview image being displayed through the display 220, based on a user input.

In operation 505, the processor 120 may perform image analysis, based on the captured image, and may identify a class related to the image, based on the image analysis. According to an embodiment, the processor 120 may identify a class related to an image, based on a result of image analysis, based on an analysis algorithm of at least one of scene classification, object detection, and/or component detection. According to an embodiment, the processor 120 may determine at least one class to which an image belongs among various classes. For example, according to a result of image analysis, one or more classes related to an image may be included.

In operation 507, the processor 120 may identify a corresponding user preference based at least on the identified class. According to an embodiment, the processor 120 may identify at least one user preference defined in (or included in) the identified class from the database 231 stored in the memory 130. According to an embodiment, the user preference may include at least one editing element related to editing of an image.

In operation 509, the processor 120 may identify whether a corresponding user preference exists (or is called). For example, the processor 120 may determine whether at least one user preference is defined in a class in the database 231.

In operation 509, when there is a user preference corresponding to a class (e.g., 'Yes' in operation 509), the processor 120 proceeds to operation 511 and may perform operations 511 and subsequent operations. In operation 509, when there is no user preference corresponding to the class (e.g., 'No' in operation 509), the processor 120 may proceed to operation 521 and may perform operations 521 and subsequent operations.

In operation 511, the processor 120 may provide at least one recommended image, based on a user preference. According to an embodiment, the processor 120 may generate a recommended image for each user preference, and provide the recommended image for each user preference together with the captured image through the display 220.

In operation 513, the processor 120 may determine whether a recommended image is selected. According to an embodiment, the processor 120 may determine whether at least one recommended image provided through the display 220 is selected by the user.

In operation 513, if the selection of the recommended image is not detected (e.g., 'No' in operation 513), for example, when storage of the image captured by the user (e.g., the original image) is selected, the processor 120 may proceed to operation 521 to perform operations 521 and subsequent operations.

In operation 513, if the processor 120 detects selection of a recommended image (e.g., 'Yes' in operation 513), in operation 515, the processor 120 may store an image, based on the recommended image. According to an embodiment, the processor 120 may store the image by applying (or editing) an editing element of the selected recommended image to the captured image. According to an embodiment, when the recommended image is provided through the display 220, the processor 120 may temporarily store a corresponding recommended image, and may also store the temporarily stored recommended image, based on a user selection. According to an embodiment, when storing the recommended image, the processor 120 may store the captured image (e.g., the original image) and the selected recommended image in association with each other according to the configuration of the electronic device 101.

In operation 517, the processor 120 may update the user preference in the class. According to an embodiment, the processor 120 may update the user preference related to the selected recommended image in the class identified in operation 507. For example, the processor 120 may count (or increase, or accumulate) the number of times (or compensation, weight) of the user preference related to the selected recommended image.

In operation 509, when a corresponding user preference does not exist (e.g., 'No' in operation 509), in operation 521, the processor 120 may determine whether there is an editing element when capturing an image. According to an embodiment, when capturing an image, the user may perform capturing by applying at least one editing element to the image using a configuring object (e.g., object 421 in FIG. 4) for configuring capturing-related functions (e.g., configuring brightness, sensitivity, or white balance). For example, a user may configure at least one editing element in a video, such as a specific filter, a specific effect (e.g., brightness, emoji, frames, and/or beauty), angle of view, and/or zoom-in/out to perform capturing. According to an embodiment, the processor 120 may monitor the user's use of an editing element while capturing is performed after entering a capturing operation (e.g., driving the camera module 180 or displaying a preview image), and may identify an editing element used for capturing, based on the monitoring result after capturing.

In operation 521, when there is an editing element when capturing an image (e.g., 'Yes' in operation 521), in operation 523, the processor 120 may update the user preference to a corresponding class according to the editing element. According to an embodiment, the processor 120 may update the user preference corresponding to the identified editing element to the class identified in operation 507. For example, when there is a user preference corresponding to the editing element identified in the class, the processor 120 may count the number of times of using the corresponding user preference. As another example, when there is no user preference corresponding to the identified editing element in the class, the processor 120 may generate (or add) a new user preference, based on the identified editing element.

In operation 521, when there is no editing element when capturing an image (e.g., 'No' in operation 521), in operation 531, the processor 120 may update the user preference to a corresponding class. According to an embodiment, the processor 120 may count the number of times the user preference is used according to the general capturing (e.g., to which the editing element is not applied or not) to the class identified in operation 507.

According to an embodiment, in the example of FIG. 5, an example of providing a recommended image, based on a user preference after capturing an image, based on a preview image has been described, but various embodiments are not limited thereto. According to an embodiment, while the preview image is displayed, the processor 120 may identify a class, based on image analysis and provide a recommended image along with the preview image, based on a user preference of the identified class. According to an embodiment, when a specific recommended image is selected in a state in which a preview image and a recommended image are provided, the processor 120 may capture and store an image by applying an editing element corresponding to the recommended image, or may apply (or edit) an editing element corresponding to the recommended image to the captured image and store the same.

Figure 6:
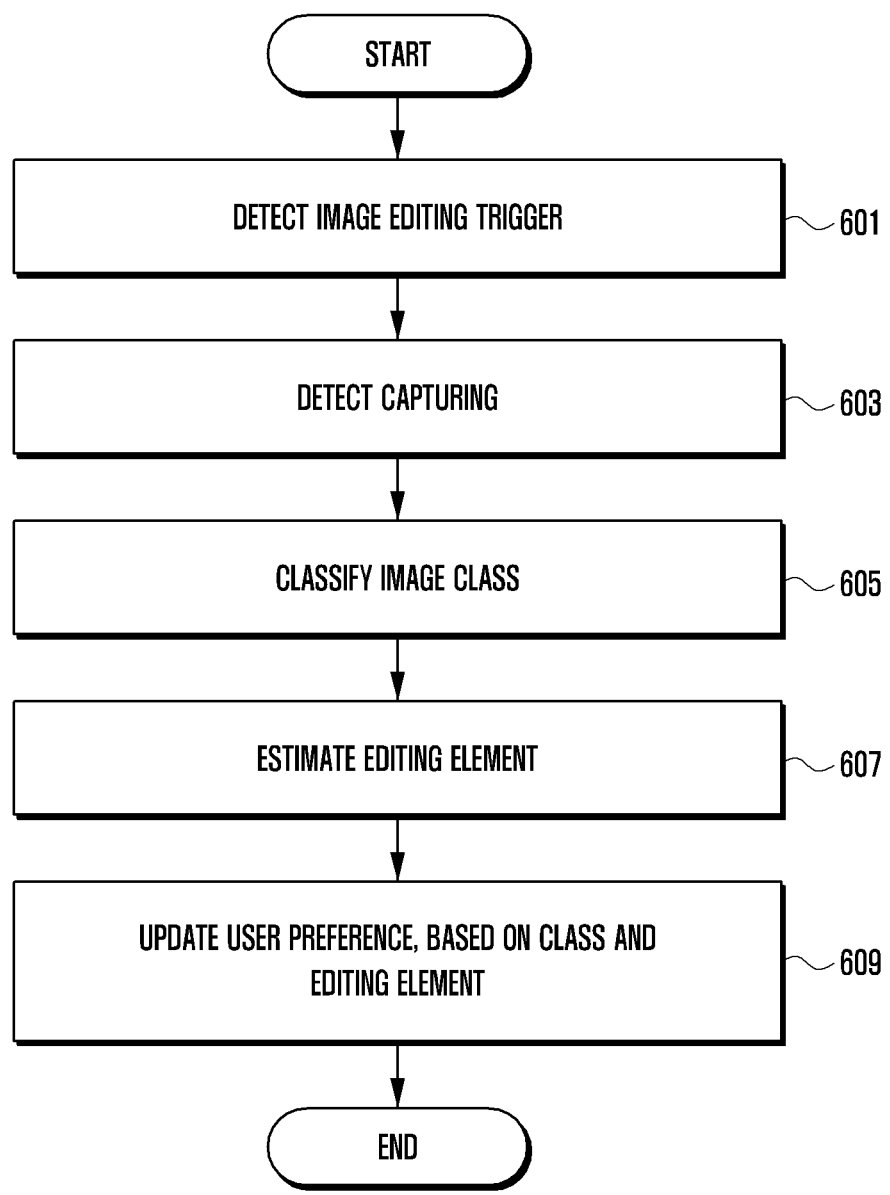
FIG. 6 is a flowchart illustrating an example of generating a user preference in an electronic device according to various embodiments.

FIG. 6 is a flowchart illustrating an example of generating a user preference in an electronic device according to various embodiments.

Referring to FIG. 6, in operation 601, the processor 120 of the electronic device 101 may detect an image editing trigger (or event). According to an embodiment, the image editing trigger may include various actions related to a user using an image such as editing video using an editing tool (or editing application) for video editing, capturing configuring while performing capturing (e.g., during preview image display), and/or external sharing of video.

In operation 603, the processor 120 may perform image analysis, based on the corresponding image. According to an embodiment, the processor 120 may perform image analysis, based at least on analysis algorithms such as scene (or image) classification, object detection, and/or composition detection, in connection with edited, captured, and/or shared images.

In operation 605, the processor 120 may classify a class related to an image, based on a result of image analysis. According to an embodiment, the processor 120 may determine at least one class to which an image belongs among various classified classes. For example, according to a result of image analysis, one or more classes related to an image may be included.

In operation 607, the processor 120 may estimate an editing element related to an image, based on a result of image analysis. According to an embodiment, the processor 120 may extract at least one editing element used for editing an image (or applied to an image). According to an embodiment, the editing element may include at least one piece of information related to brightness, tone curve, color curve, contrast, crop, saturation, sharpness, magnify, composition, and/or human area (e.g., editing information or configuring information).

According to an embodiment, operations 605 and 607 are not limited to the illustrated order, and operations 605 and 607 may be performed in parallel, in reverse order, or heuristically.

In operation 609, the processor 120 may update at least one user preference based at least on the classified class and the estimated editing element. According to an embodiment, the processor 120 may update the user preference corresponding to the estimated editing element to the classified class. For example, when there is a user preference corresponding to the editing element identified in the class, the processor 120 may count the number of times of using the corresponding user preference. As another example, when there is no user preference corresponding to the identified editing element in the class, the processor 120 may create (or add) a new user preference, based on the identified editing element.

According to an embodiment, the processor 120 may update at least one user preference based at least on the classified class. For example, the processor 120 may generate (or add) a class to a database (e.g., the database 231 of FIG. 2) in a memory (e.g., the memory 130 of FIG. 2), and may update at least one user preference in the generated (or added) class.

For example, when the class of the image classified through operation 605 is not included in the database 231, the processor 120 may generate (or add) a new class (e.g., robot), and may provide a user interface (e.g., an interface related to adding a class name through a user input) related to the new generated (or added) class through a display (e.g., the display 220 of FIG. 2).

For example, the processor 120 may identify (or obtain) a class name related to a new class through a user input and/or an external device (e.g., cloud, server, or another electronic device). According to an embodiment, the processor 120 may generate (or add) a new class (or new class name) identified through a user interface (e.g., an interface related to adding a class name through a user input) and/or an external device to the database 231 (or adding), and may include the editing element estimated through operation 607 in the new class (or new class name) generated (or added).

Figure 7:
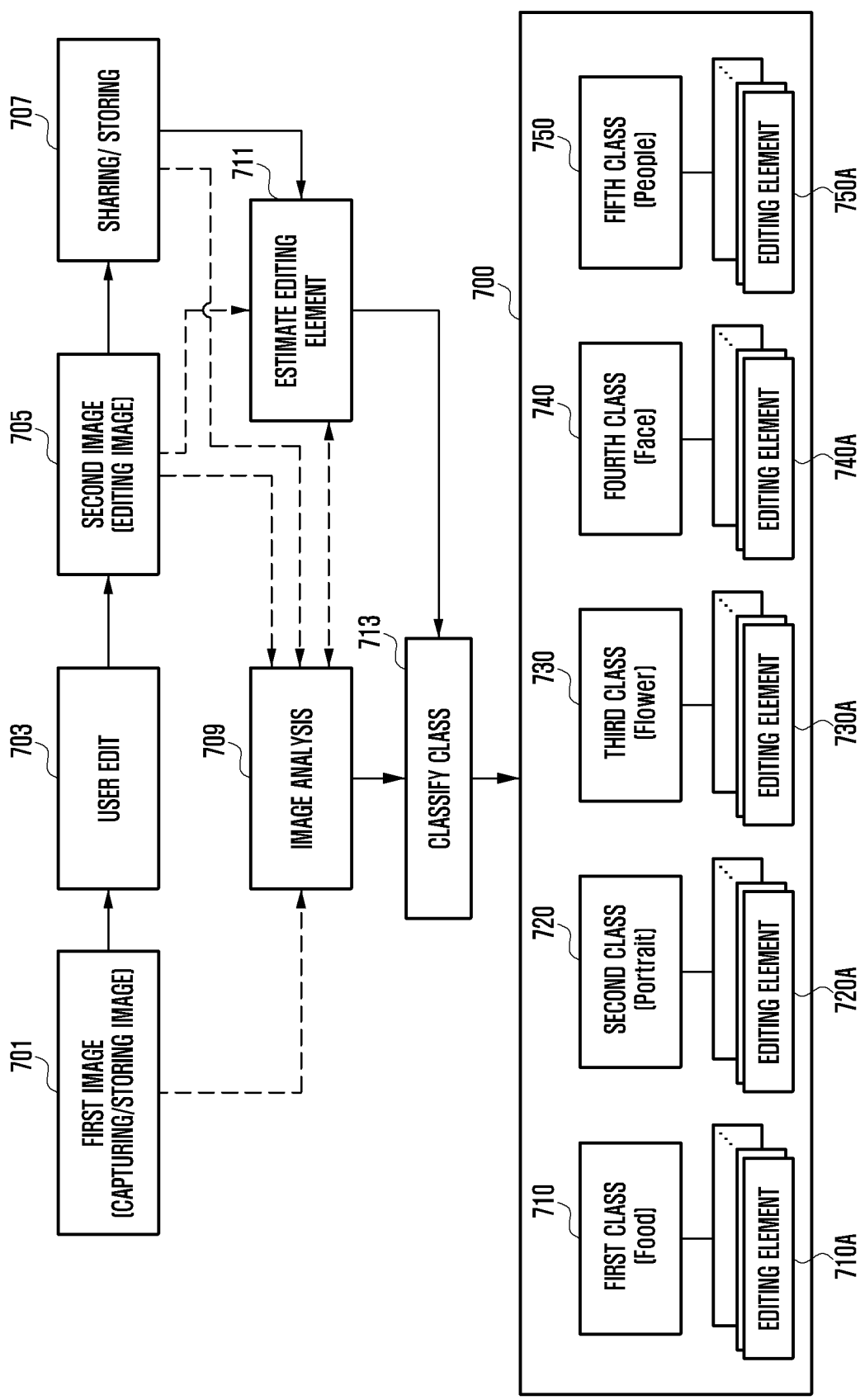
FIG. 7 is a diagram illustrating an example of configuring a database, based on user preference in an electronic device according to various embodiments.

FIG. 7 is a diagram illustrating an example of configuring a database, based on user preference in an electronic device according to various embodiments.

As shown in FIG. 7, the electronic device 101 may include a database 700 (e.g., the database 231 of FIG. 2). According to an embodiment, the database 700 may include a plurality of classes (e.g., a first class 710, a second class 720, a third class 730, a fourth class 740, a fifth class (750)), and may include user preferences 710A, 720A, 730A, 740A, and 750A composed of at least one editing element for each class 710, 720, 730, 740, and 750. According to an embodiment, the class may be classified in various ways, such as face, baby, person, dog, cat, food, people, beaches, sky, mountain, sunset, sunrise, city, snow, waterfall, watersides, scenery, stage, vehicles, drinks, flowers, trees, greenery, animal, shoes, backlit, indoor, text, clothes, and/or night view.

Figure 9:
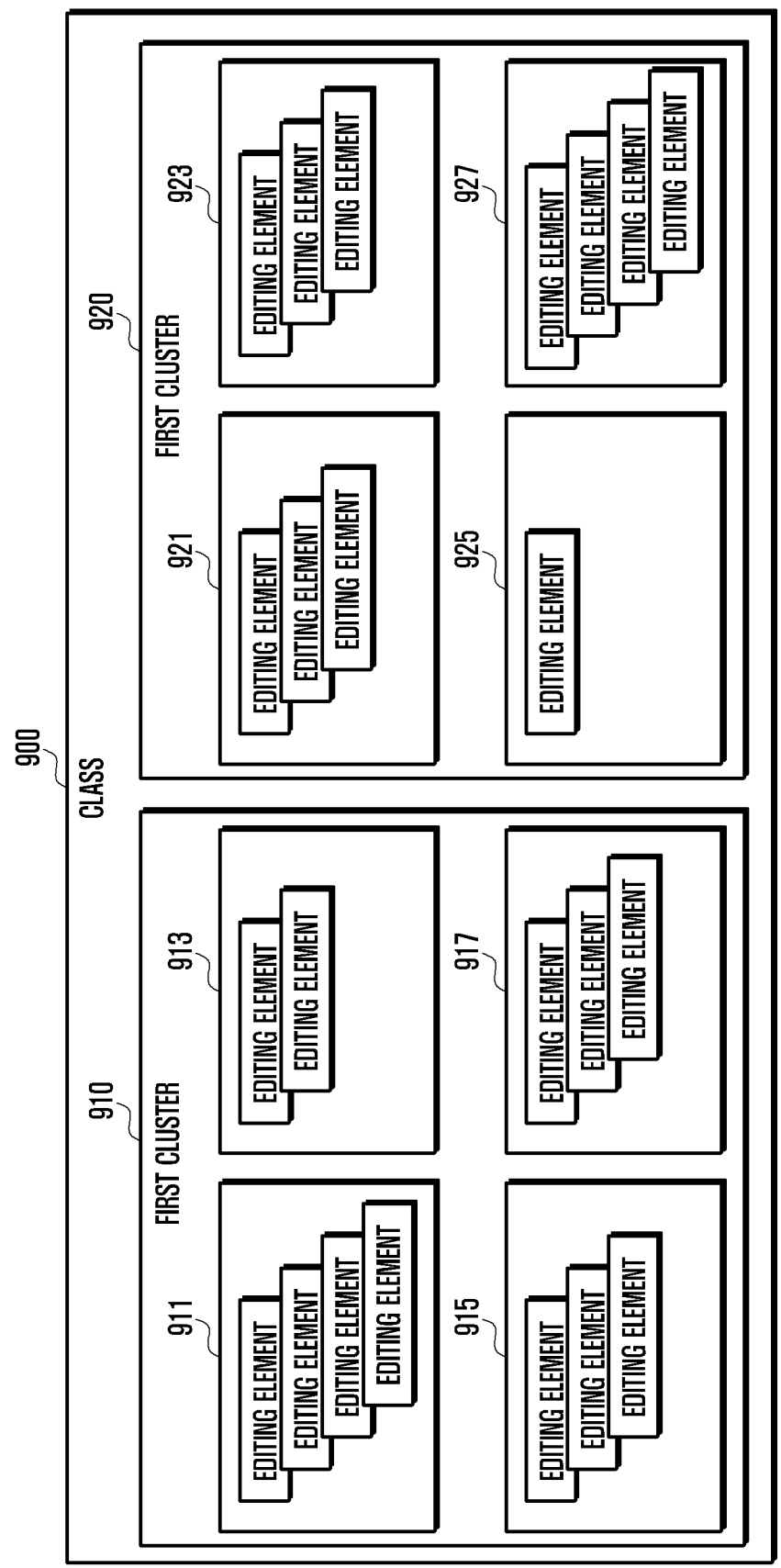
FIG. 9 is a diagram illustrating an example of configuring user preferences in a database of an electronic device according to various embodiments.

According to an embodiment, in the example of FIG. 7, each of the classes 710, 720, 730, 740, and 750 may include one user preference as an example, but the classes 710, 720, 730, 740, 750 may each include a plurality of user preferences. An example of this is shown in FIG. 9. According to an embodiment, when there is no editing of an image related to user preference in a specific class and an editing element according to the editing element is not estimated, the user preference may not be configured in a specific class.

Referring to FIG. 7, the user may use a first image 701 such as an image capturing or stored image. For example, the user may select the first image 701 for image editing using an editing tool or may select the first image 701 for image capturing using the camera module 180. According to an embodiment, the electronic device 101 provides the image stored in the memory 130 as the first image 701 through the display 220, or may provide an image obtained through the camera module 180 in an image capturing operation as the first image 701 through the display 220.

According to an embodiment, the user may perform user editing 703, based on the first image 701. According to an embodiment, the user may obtain the second image 705 (e.g., edited image) by storing the image according to the user edit 703. For example, the user may obtain the second image 705 by editing the image using an editing tool for the first image 701. As another example, the user may obtain the second image 705 by capturing the first image 701. According to an embodiment, the user may share (707) the second image 705 according to the user edit (703) to the outside (or an external electronic device (e.g., the electronic device 102, 104, or 108 of FIG. 1)), or may store (707) in the memory 130 of the electronic device 101.

According to various embodiments, the electronic device 101 may perform image analysis 709 for class classification 713 of a corresponding image (e.g., the first image 701 and/or the second image 705), based at least on the first image 701 and/or the second image 705. For example, the electronic device 101 may analyze the first image 701 and/or the second image 705 in real time or, in Example 707, may analyze an externally shared and/or stored image.

According to an embodiment, the electronic device 101 may identify the classes 710, 720, 730, 740, and 750 of the image, based on an analysis algorithm of at least one of scene (or image) classification, object detection, and/or composition detection. According to an embodiment, the classes 710, 720, 730, 740, 750 may be classified in various ways, such as face, baby, person, dog, cat, food, people, beaches, sky, mountain, sunset, sunrise, city, snow, waterfall, watersides, scenery, stage, vehicles, drinks, flowers, trees, greenery, animal, shoes, backlit, indoor, text, clothes, and/or night view. According to an embodiment, the electronic device 101 may determine at least one class to which an image belongs among the classes 710, 720, 730, 740, and 750 classified in various ways in the database 700. For example, according to a result of image analysis, one or more classes related to an image may be included.

According to various embodiments, when the second image 705 is shared or stored 707, the electronic device 101 may estimate (711) an editing element of the second image 705, based on the second image 705. According to an embodiment, the electronic device 101 may estimate an editing element from a target image, based on an image editing trigger. According to an embodiment, the electronic device 101 may estimate (711) an editing element, based on a user action according to the user editing (703) in the second image (705). For example, the electronic device 101 may estimate brightness, tone curve, color curve, contrast, crop, saturation, sharpness, magnify, composition, image filter, rotation, and/or an editing element according to processing (e.g., changes, configurations, and/or application) on the human area from the second image 705.

According to an embodiment, in Example 709, after analyzing the image related to the first image 701 and/or the second image 705, the electronic device 101 may estimate the editing element (711), or in Example 711, may perform image analysis after estimating the editing element. For example, the electronic device 101 may perform the image analysis 709 and/or the editing element estimation 711 sequentially, in reverse sequence, or in parallel.

According to various embodiments, the electronic device 101 may update the user preference in the database 700, based on the classified class and editing element. According to an embodiment, the electronic device 101 may update the user preference, based on the classified class in Example 713 among the classes 710, 720, 730, 740, and 750 of the database 700. According to an embodiment, when the user preference, based on the editing element estimated in Example 711 exists in the corresponding class, the electronic device 101 may count (or increase, or accumulate) the number of uses (or compensation, weight) of the corresponding user preference. According to an embodiment, when the user preference, based on the editing element estimated in Example 711 does not exist in the corresponding class, the electronic device 101 may generate a new user preference, based on the estimated editing element and add it to a corresponding class of the database 700.

Figure 8A:
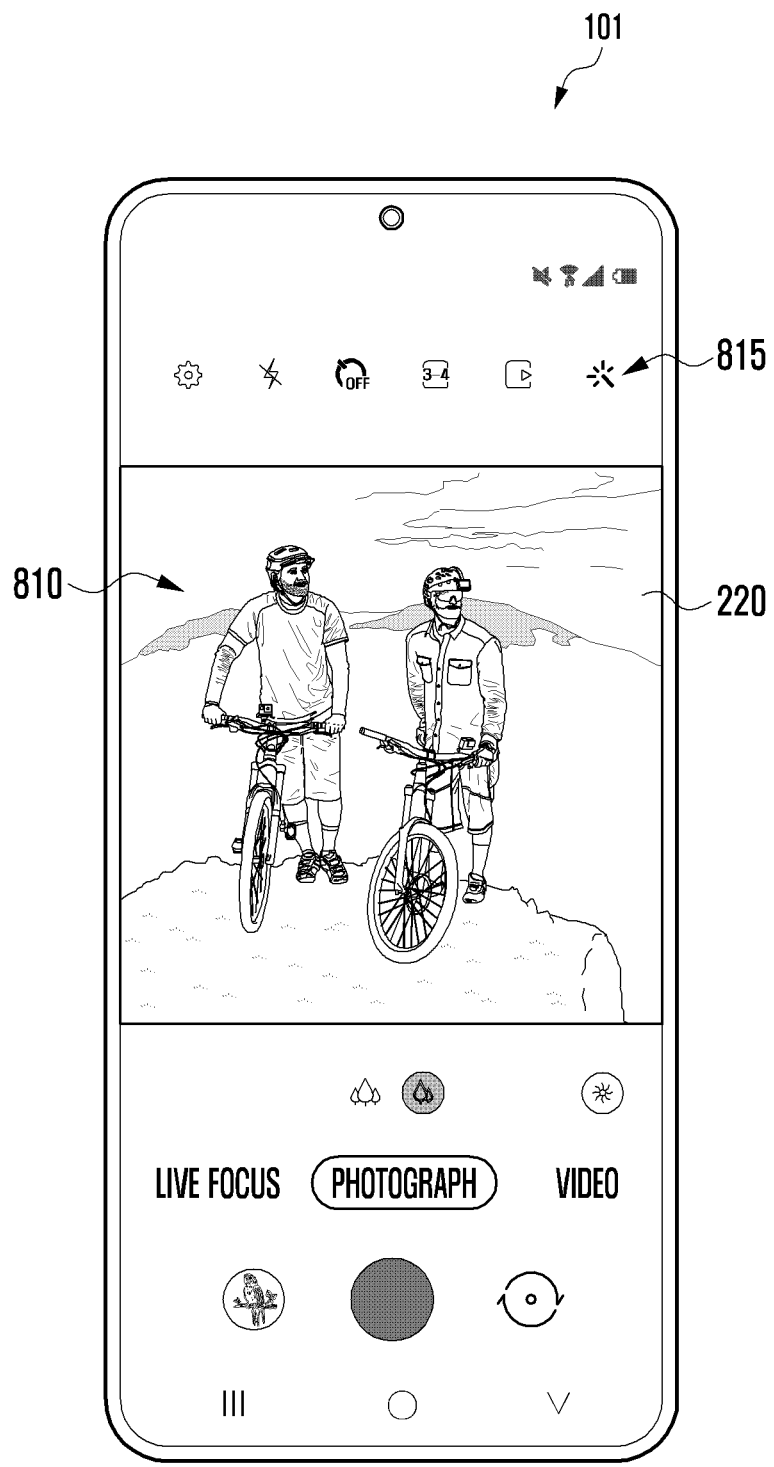
FIGS. 8A, 8B, and 8C are diagrams illustrating an example of a user's image editing trigger in an electronic device according to various embodiments.
Figure 8B:
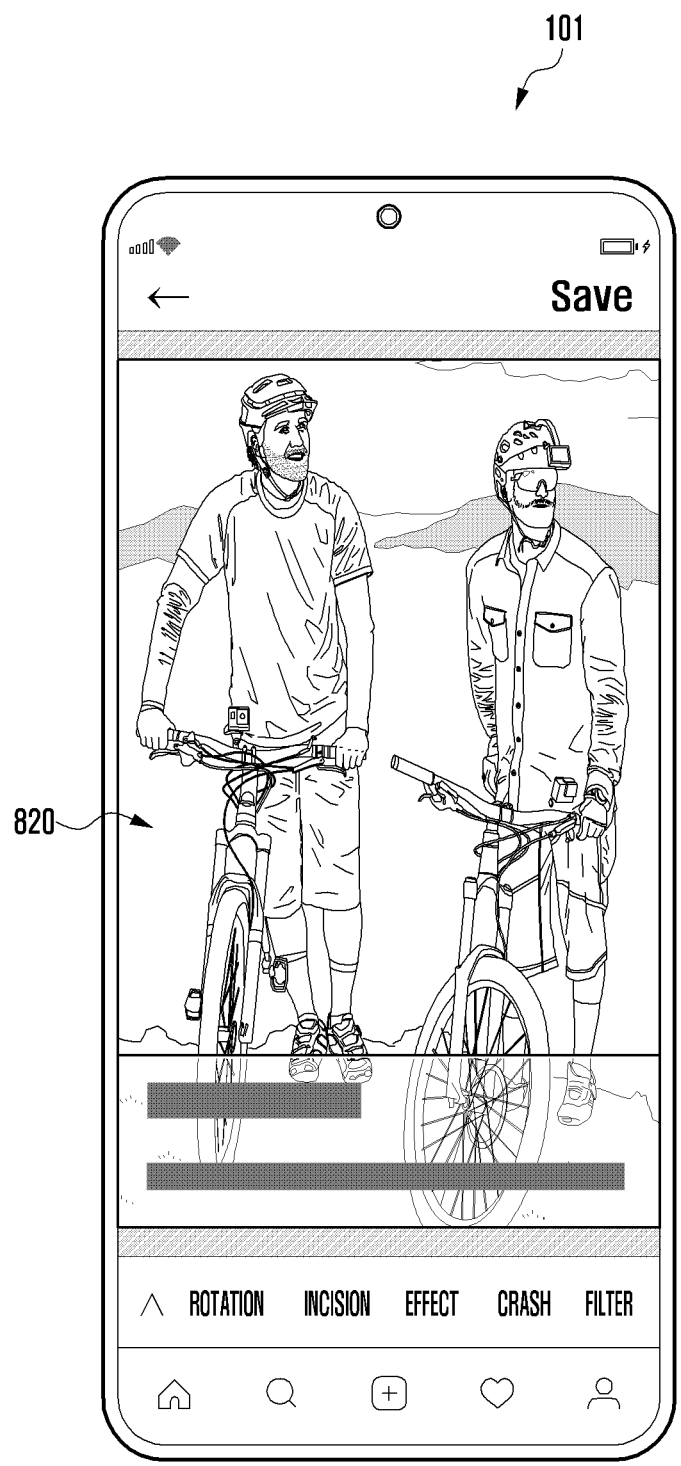
Figure 8C:
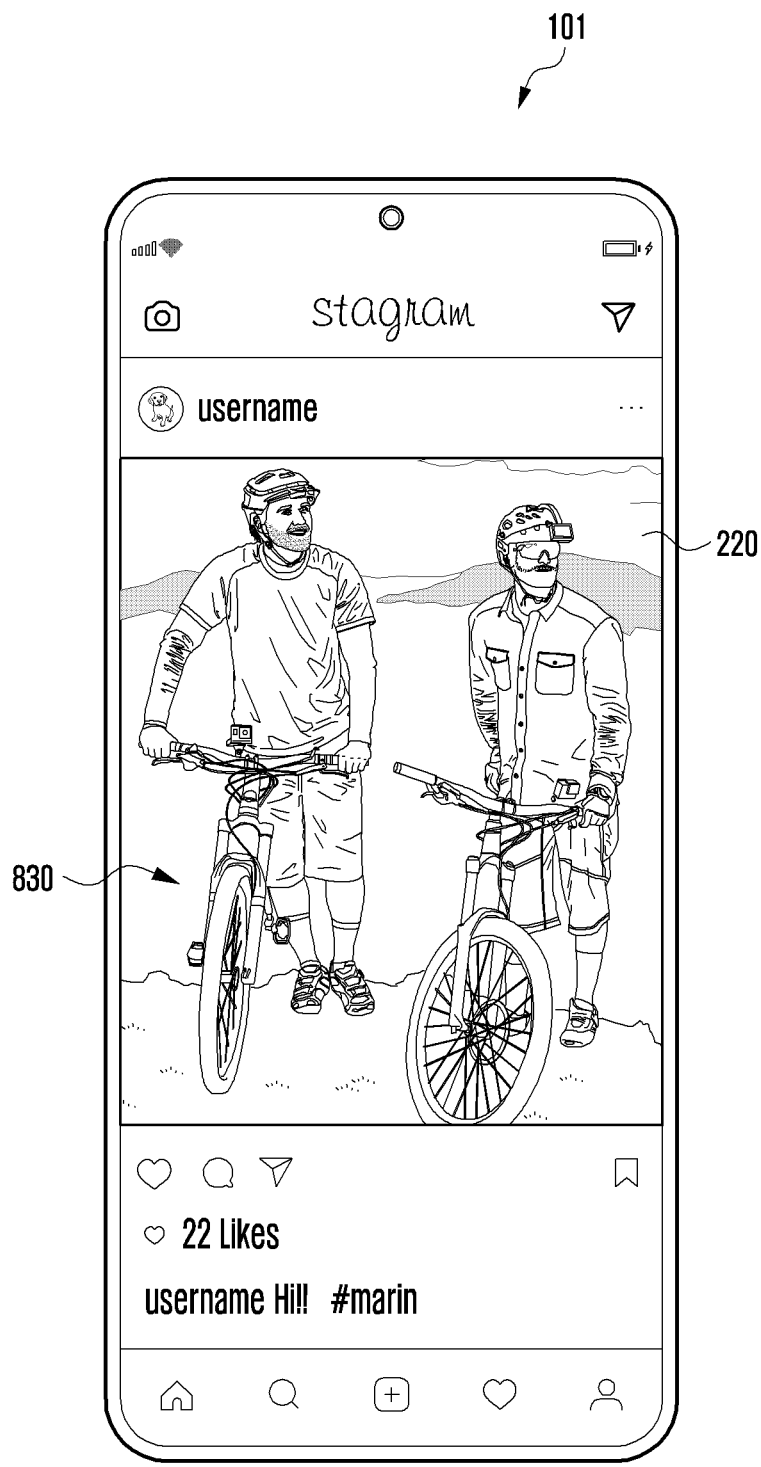

FIGS. 8A, 8B, and 8C are diagrams illustrating an example of a user's image editing trigger in an electronic device according to various embodiments.

As shown in FIGS. 8A, 8B, and 8C, FIGS. 8A, 8B, and 8C are diagrams illustrating an example in which an image editing trigger for estimating an editing element is generated by the electronic device 101.

FIG. 8A according to an embodiment shows an example of capturing, during video recording (e.g., during preview video display), by applying at least one editing element to an image using the configuring object 815 for configuring capturing-related functions (e.g., configuring brightness, sensitivity, or white balance) by a user. According to an embodiment, the user may configure at least one editing element such as specific filters, specific effects (e.g., brightness, emoji, frames, and/or beauty), angle of view, and/or zoom-in/out in the image 810 to perform capturing. According to an embodiment, the electronic device 101 may detect an image editing trigger, based on a result of performing capturing. For example, the electronic device 101 may estimate a class and/or an editing element from the captured image 810.

FIG. 8B, according to an embodiment, shows an example of editing the image 820 by applying at least one editing element to the image 820 using an editing tool (or editing application) for image editing of the electronic device 101 by a user. According to an embodiment, the user may perform various edits such as brightness, tone curve, color curve, contrast, crop, saturation, sharpness, magnify, composition, image filter, rotation, and/or human area processing and/or person shape calibration of the image 820 using the editing tool. According to an embodiment, the electronic device 101 may detect an image editing trigger, based on a result of editing an image using an editing tool. For example, the electronic device 101 may estimate a class and/or an editing element from the edited image 820.

In FIG. 8C according to an embodiment, an image (e.g., a captured image, a stored image) of the electronic device 101 may be shared (or transmitted) by a user with an external device (e.g., a cloud, a social network, and/or another electronic device). For example, FIG. 8C shows an example in which the electronic device 101 provides an image 830 shared to an external device (e.g., a social network) through the display 220. According to an embodiment, the electronic device 101 may detect an image editing trigger, based on the image sharing of the electronic device 101. For example, the electronic device 101 may estimate a class and/or an editing element from the shared image 830.

FIG. 9 is a diagram illustrating an example of configuring user preferences in a database of an electronic device according to various embodiments.

According to an embodiment, the electronic device 101 may include a plurality of classes, and may include user preferences including at least one editing element for each class in a database (e.g., the database 700 of FIG. 7 or the database 231 of FIG. 2). According to an embodiment, FIG. 9 shows an example of user preferences configured in any one class 900 among a plurality of classes.

Referring to FIG. 9, the class 900 may classify user preferences into respective clusters (or groups) in which similar editing elements among various editing elements are clustered. According to an embodiment, the class 900 may include a first cluster 910 and a second cluster 920. According to an embodiment, the first cluster 910 may include a first user preference 911 with four editing elements, a second user preference 913 with two editing elements, a third user preference 915 with three editing elements, and/or a fourth user preference 917 with three editing elements. According to an embodiment, the second cluster 920 may include a fifth user preference 921 with three editing elements, a sixth user preference 923 with three editing elements, a seventh user preference 925 with one editing element, and/or an eighth user preference 927 with four editing elements.

According to an embodiment, the electronic device 101 may cluster similar edit elements by applying an average of various edit elements, classify them into corresponding clusters, and manage them. For example, the editing element of the first cluster 910 may be a group including at least one editing element such as brightness, tone curve, color curve, contrast, crop, saturation, and/or sharpness in common. As another example, the editing element of the second cluster 920 may be a group including at least one editing element such as crop, magnify, composition, image filter, rotation, and/or human area processing in common. According to an embodiment, the electronic device 101 may recommend user preferences in the order of the clusters most frequently selected by the user.

According to an embodiment, the electronic device 101 may include user information (or personal information) stored in a memory (e.g., the memory 130 of FIG. 2) as various editing elements. For example, when the classified class is person, the electronic device 101 may configure different editing elements applied to each person. For example, the electronic device 101 may apply the first user preference 911 to person A among a plurality of people (e.g., A, B, or C), apply the fifth user preference 921 to person B, and apply the first user preference 911 and the fifth user preference 921 to person C. According to an embodiment, the electronic device 101 may include a specified phrase (e.g., text) and/or an image (e.g., an icon or an emoji) as various editing elements. For example, when the classified class is animal, the electronic device 101 may include a specified phrase (e.g., lovely) and/or an image (e.g., heart (v)) as editing elements.

Figure 10:
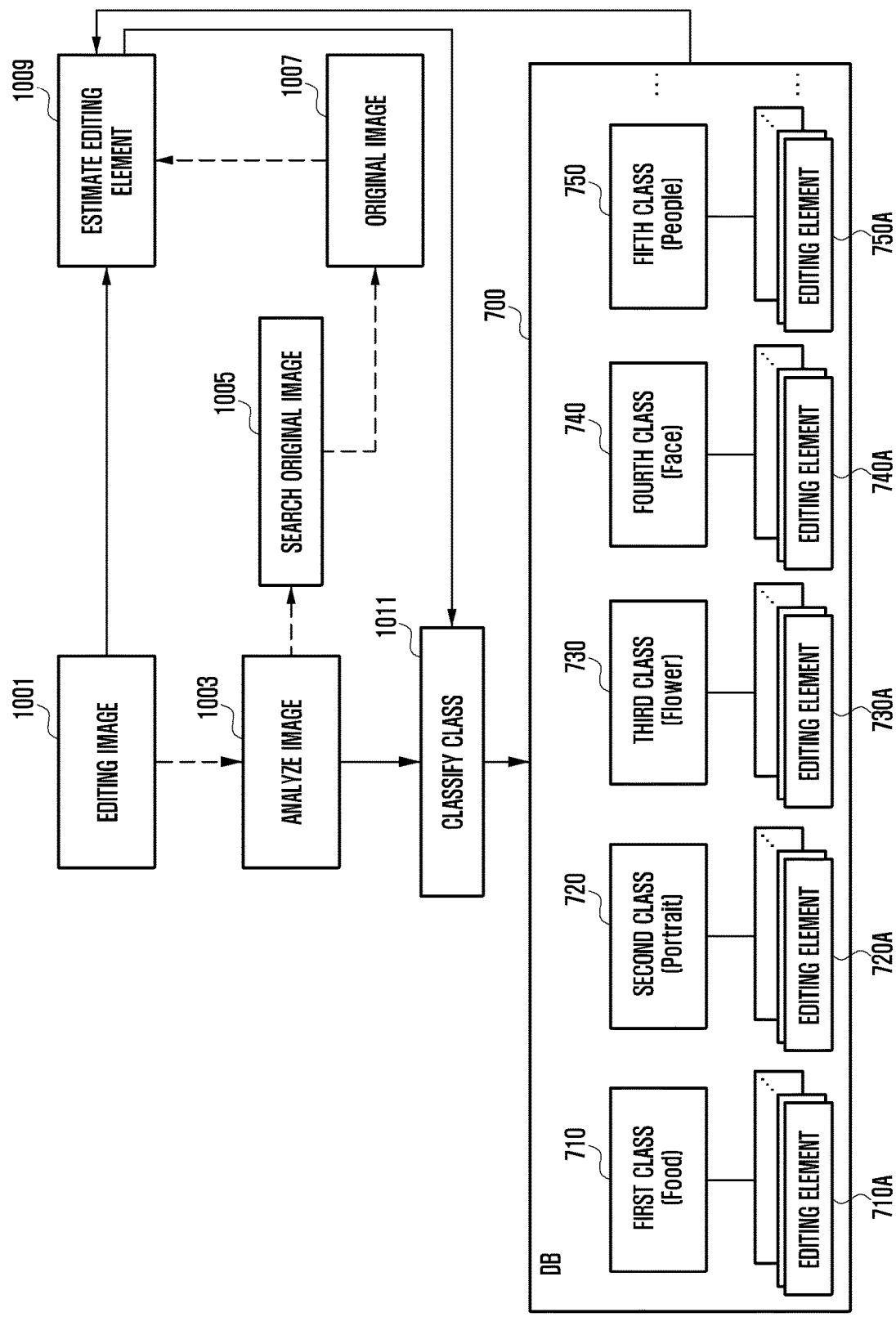
FIG. 10 is a diagram illustrating an example of extracting an editing element in an electronic device according to various embodiments.

FIG. 10 is a diagram illustrating an example of extracting an editing element in an electronic device according to various embodiments.

As shown in FIG. 10, the electronic device 101 may include a database 700 (e.g., the database 231 of FIG. 2). According to an embodiment, the database 700 may correspond to what has been described in the description with reference to FIGS. 7 and/or 9.

Referring to FIG. 10, a user may store and/or share an edited image 1001 edited with an editing tool. According to an embodiment, the electronic device 101 may determine the image analysis 1003 for estimating the class and/or editing element of the edited image 1001, based at least on the storage and/or sharing of the edited image 1001.

According to an embodiment, the electronic device 101 may perform an image analysis, based on the determination of the image analysis 1003 and classify a class 1011 of the edited image 1001.

According to an embodiment, the electronic device 101 may perform an original image search 1005 corresponding to the edited image 1001, based on the determination of the image analysis 1003. For example, the electronic device 101 may determine whether there is an original image 1007 stored in association with the edited image 1001 in the memory 130 of the electronic device 101. According to an embodiment, the electronic device 101 may identify whether the edited image 1001 and the original image 1007 are related, based on metadata (e.g., image file information and/or exchangeable image file format (EXIF) information) stored together when an image is created.

According to an embodiment, when the original image 1007 associated with the edited image 1001 is searched for (e.g., if it exists in the memory 130), the electronic device 101 may perform the editing element estimation 1009, based on the edited image 1001 and the original image 1007. The electronic device 101 may compare the edited image 1001 with the original image 1007, and may estimate an editing element for the edited image 1001, based on the difference in editing elements between the edited image 1001 and the original image 1007. For example, the electronic device 101 may analyze composition information such as a color curve, sharpness, position and size of a saliency object, and/or a difference in editing elements such as processing of a human area.

According to an embodiment, when the original image 1007 associated with the edited image 1001 is not searched (e.g., does not exist in the memory 130), the electronic device 101 may extract information on the classified class from the database 700, and estimate an editing element for the edited image 1001, based on the extracted information. According to an embodiment, the electronic device 101 may extract a feature vector by analyzing the contents of an edited and stored image (e.g., the edited image 1001), and classify an image class, based on the extracted feature vector. Thereafter, the electronic device 101 may extract an editing element related to the image, based on the corresponding class. For example, the electronic device 101 may estimate composition information such as a position and size of a color curve, sharpness, and saliency object, and/or an editing element such as processing of a human area, from a corresponding class of the database 700.

According to an embodiment, the electronic device 101 may use an average value of editing elements belonging to a class in the edited image 1001 as an estimated value of the original image. For example, when the class to which the image belongs is a night view, the electronic device 101 may predict that an average feature of an image belonging to the night view class (e.g., a form in which a color tone curve is concentrated in dark tones and has low sharpness) is a feature of the original image. According to an embodiment, the average feature related to color tone may be predicted by the learned deep learning network, and may also be calculated using a histogram method. According to an embodiment, sharpness may be predicted with a difference from an average gradient distribution of a class to which the edited image 1001 belongs with the gradient of the edited image 1001. According to an embodiment, information on composition may also be predicted using the edited image 1001. According to an embodiment, information on person calibration may be estimated using a class to which the edited image 1001 belongs and an image content of the edited image 1001.

According to an embodiment, the electronic device 101 may update the user preference in the database 700, based on the classified class and an editing element (e.g., an estimated editing element). According to an embodiment, the electronic device 101 may update the user preference, based on the classified class in Example 1011 among the classes 710, 720, 730, 740, and 750 of the database 700.

Figure 11:
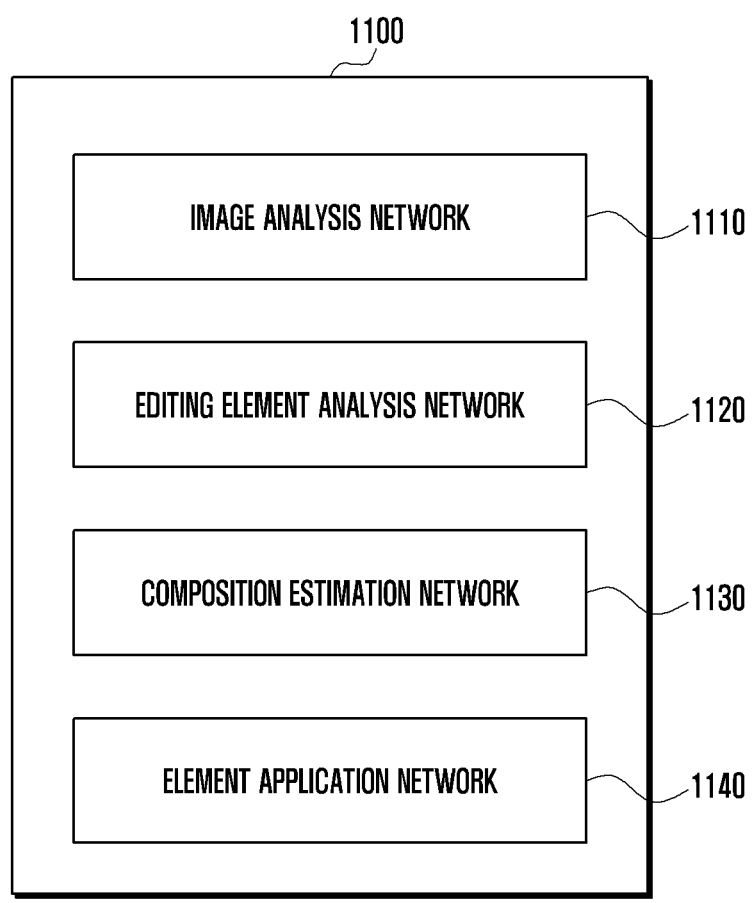
FIG. 11 is a diagram illustrating an example of image analysis for user preference in an electronic device according to various embodiments.

FIG. 11 is a diagram illustrating an example of image analysis for user preference in an electronic device according to various embodiments.

Figure 12:
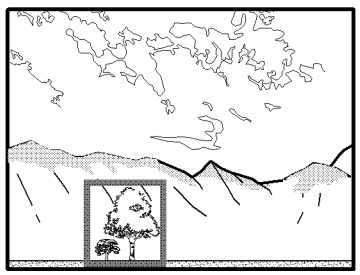
FIG. 12 is a diagram illustrating an example of classifying an editing element from an image in an electronic device according to various embodiments.
Figure 12:
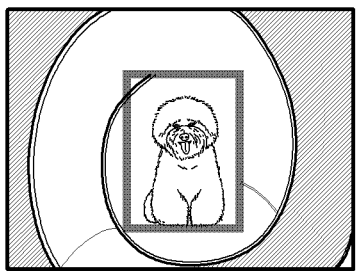
Figure 12:
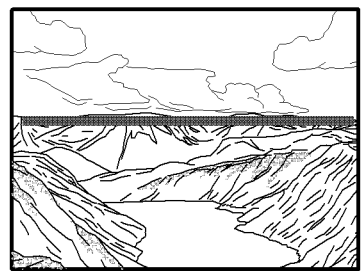
Figure 12:
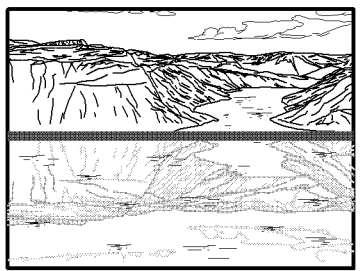
Figure 12:
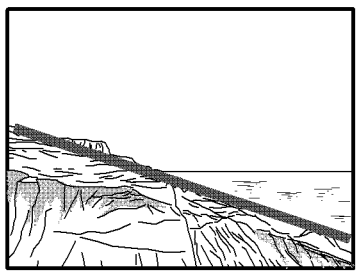
Figure 12:
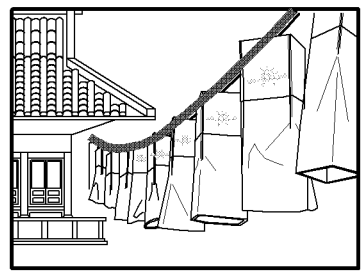
Figure 12:
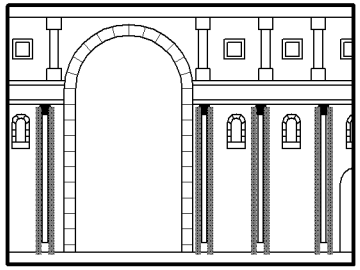
Figure 12:
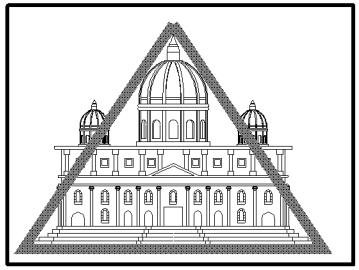
Figure 12:
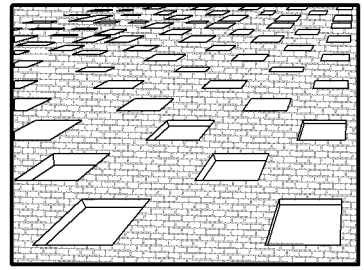

FIG. 12 is a diagram illustrating an example of classifying an editing element (e.g., composition) from an image in an electronic device according to various embodiments.

According to an embodiment, FIG. 11 shows an example of the artificial intelligence model 1100 (or AI network) of the electronic device 101. According to various embodiments, the electronic device 101 may analyze and/or provide user preferences using the artificial intelligence model 1100. According to an embodiment, the artificial intelligence model 1100 may be generated through machine learning in the electronic device 101. According to some embodiments, learning may be performed through a separate server. For example, in the artificial intelligence model 1100, the electronic device 101 may learn and determine user preference by itself, the recognition rate of user preference may be improved in proportion to learning, and the user's intention may be more accurately understood.

According to an embodiment, the artificial intelligence model 1100 may include an image analysis network (or algorithm) 1110, an editing element analysis network 1120, a composition estimation network 1130, and/or an element application network 1140.

According to an embodiment, the image analysis network 1110 may receive an image (e.g., an original image, an edited image, and/or a reduced image) as an input, and may output a class of an image through image analysis, based on the image. According to one embodiment, for the input image, the image analysis network 1110 may output information on at least one class to which an image belongs among classes such as face, baby, person, dog, cat, food, people, beaches, sky, mountain, sunset, sunrise, city, snow, waterfall, watersides, scenery, stage, vehicles, drinks, flowers, trees, greenery, animal, shoes, such as backlit, indoor, text, clothes, and/or night view.

According to an embodiment, the editing element analysis network 1120 may receive an image (e.g., an original image, an edited image, and/or a thumbnail) as an input, and estimate and output an original shape before applying an editing element (e.g., brightness, contrast, tone curve, and/or color curve) to the image. According to an embodiment, the editing element analysis network 1120 may estimate the editing element using at least two images (e.g., an input image and an output image) using a regression analysis method.

According to an embodiment, the composition estimation network 1130 may indicate an example to the editing element analysis network 1120. According to an embodiment, the composition estimation network 1130 receives an image (e.g., an original image, an edited image, and/or a reduced image) as an input, and output a classification result (e.g., composition type) of a composition applied to an image (e.g., photo). According to an embodiment, the composition estimation network 1130 may provide a classification result of a composition applied to an image, based on the composition type as illustrated in FIG. 12.

Referring to FIG. 12, FIG. 12 shows examples of various compositions. For example, the composition estimation network 1130 may estimate the composition, such as rule of thirds 1210, center 1220, horizontal 1230, symmetric 1240, diagonal 1250, curved 1260, vertical 1270, triangle 1280, and/or pattern 1290, based at least on the position and/or size of the feature object (e.g., saliency object) in the image.

According to an embodiment, the element application network 1140 may receive an image (e.g., an original image, an edited image, and/or a reduced image) as an input, and perform element detection related to various editing elements to apply the detected element to an image. According to an embodiment, the element application network 1140 may perform composition element detection related to composition to apply the detected composition element to an image. For example, the element application network 1140 may apply an editing element (e.g., composition) preferred by the user to the image by using the detected element (e.g., composition).

According to an embodiment, the composition preferred by the user may be applied in at least two steps. For example, the composition estimation network 1130 may detect a composition element from the image, and the element application network 1140 may perform, for example, crop, rotation, and/or resize to fit the user's preferred composition using the detected composition element.

According to an embodiment, the composition estimation network 1130 may detect (or estimate) a composition element such as a main object (or subject) and a horizontal line and/or a line of a building (e.g., lines related to composition) in an image. For example, if it is assumed that the user prefers the rule of thirds composition, the element application network 1140 may apply the composition so that the main subject occupies about ⅓ of the image (e.g., photo) by using the rule of thirds composition.

According to an embodiment, in applying various editing elements, when a plurality of people (e.g., A, B, or C) are analyzed in the image analysis network 1110, the element application network 1140 may apply different editing elements (e.g., the first user preference 911 to the eighth user preference 927 of FIG. 9) to each person. For example, in applying the recommended image (e.g., the recommended image 1400 of FIG. 14), the element application network 1140 may apply the first user preference 911 related to person A to the first recommended image (e.g., the first recommended image 1410 of FIG. 14), apply a fifth user preference 921 to the second recommended image (e.g., the second recommended image 1420 of FIG. 14), and apply the first user preference 911 related to person A and the fifth user preference 921 related to person B to the third recommended image (e.g., the third recommended image 1430 of FIG. 14).

Figure 13A:
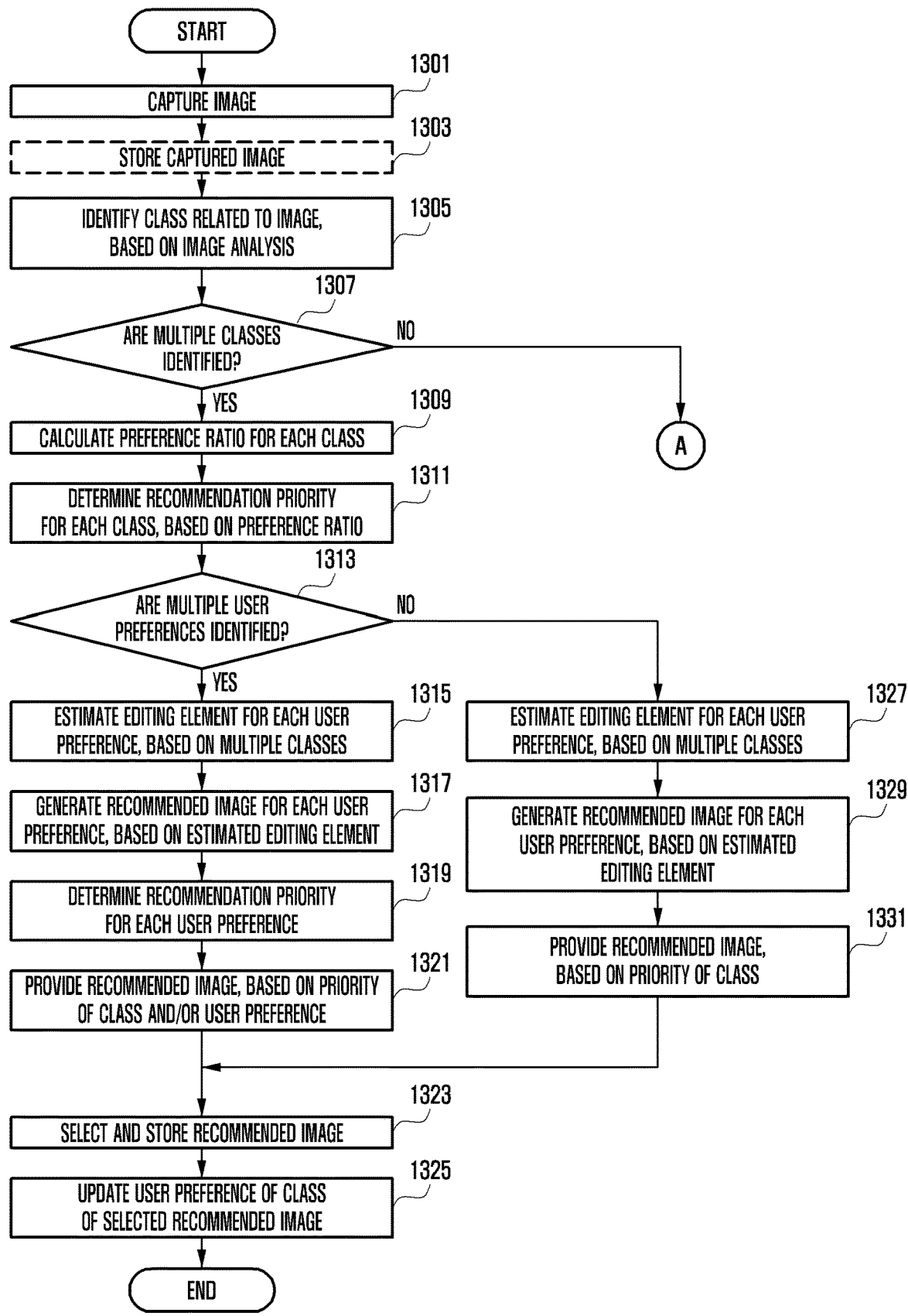
FIGS. 13A and 13B are flowcharts illustrating an operation of an electronic device according to various embodiments.
Figure 13B:
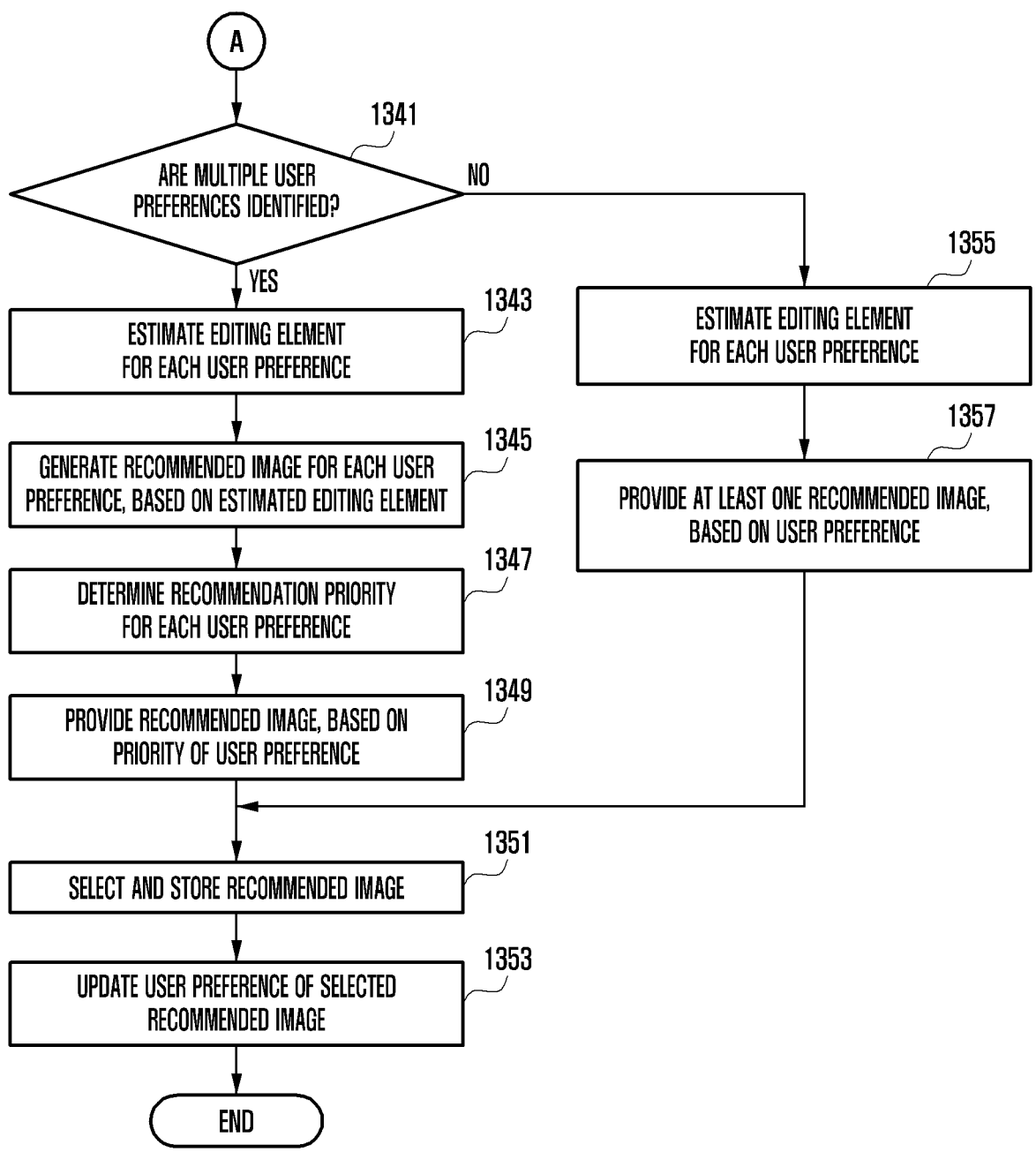

FIGS. 13A and 13B are flowcharts illustrating an operation of an electronic device according to various embodiments.

Referring to FIGS. 13A and 13B, in operation 1301, the processor 120 of the electronic device 101 may capture an image, based on a user input. According to an embodiment, the processor 120 may obtain a preview image from the camera module 180 and provide the preview image through the display 220, and capture (or shoot) at least a portion of the preview image being displayed through the display 220 in response to a user input.

In operation 1303, the processor 120 may store the captured image in the memory 130. According to some embodiments, the processor 120 may not directly store the captured image in the memory 130, but temporarily store the same in a designated buffer of the memory 130, and store at least one of the captured image and the recommended image in the memory 130, based on whether the recommended image is selected.

In operation 1305, the processor 120 may identify a class related to the image, based on the image analysis. According to an embodiment, the processor 120 may perform image analysis, based on the captured image, and may identify a class (or subject) related to the image, based on the result of the image analysis. According to an embodiment, the processor 120 may determine at least one class to which the image belongs from among the classes classified variously in the database 700.

In operation 1307, the processor 120 may determine whether a plurality of classes are identified based on the identification result. For example, the processor 120 may determine whether a class related to an image is one class or a plurality of classes.

In operation 1307, when the identified class corresponds to a plurality of classes (e.g., 'Yes' in operation 1307), the processor 120 may proceed to operation 1309 to perform operations 1309 or less. In operation 1307, when the identified class corresponds to one (or a single) class (e.g., 'No' in operation 1307), the processor 120 may proceed to operation 1341 and perform operations 1341 and subsequent operations.

In operation 1309, the processor 120 may calculate a preference ratio for each class. According to an embodiment, when the first class and the second class are identified, the processor 120 may calculate a preference ratio of the first class and the second class, based on the usage history of the user related to the first class and the second class. For example, the processor 120 may determine that the usage ratio of the first class is about 60% and the usage ratio of the second class is about 40%, based on the usage history for each class.

In operation 1311, the processor 120 may determine a recommendation priority for each class, based on the preference ratio for each class. According to an embodiment, the processor 120 may give a high priority to a class (e.g., the first class) having a high preference ratio (or usage ratio) of the class.

In operation 1313, the processor 120 may determine whether a plurality of user preferences are identified, based on the identified class. For example, the processor 120 may determine whether each class includes one user preference or a plurality of user preferences.

In operation 1313, when the at least one class includes a plurality of user preferences (e.g., 'Yes' in operation 1313), the processor 120 may proceed to operation 1315 and perform operations 1315 and subsequent operations. In operation 1313, when one user preference is included in each class (e.g., 'No' in operation 1313), the processor 120 may proceed to operation 1327 and perform operations 1327 and subsequent operations.

In operation 1315, the processor 120 may estimate an editing element for each user preference, based on a plurality of classes. According to an embodiment, the processor 120 may estimate a first editing element group related to a corresponding user preference from a class including one user preference, and respectively estimate a second editing element group and a third editing element group related to each user preference in a class including a plurality of user preferences (e.g., at least two user preferences). According to an embodiment, each of the first editing element group, the second editing element group, and/or the third editing element group may include one or more editing elements.

In operation 1317, the processor 120 may generate a recommended image for each user preference, based on the estimated editing element. According to an embodiment, the processor 120 may generate a plurality of recommended images respectively corresponding to each class, based on user preference for each class. According to an embodiment, the processor 120 may generate one or more recommended images for each class, based on one or more user preferences for each class.

In operation 1319, the processor 120 may determine a recommendation priority for each user preference. According to an embodiment, the processor 120 may determine a priority among the plurality of user preferences in a class including the plurality of user preferences. For example, when the processor 120 includes two user preferences in any one class, the processor 120 may give a high priority from a user preference having a high preference ratio (or usage ratio) of the user preference, based on the user's usage history related to each user preference.

In operation 1321, the processor 120 may provide a recommended image, based on a priority of a class and/or user preference. According to one embodiment, the processor 120 may provide the recommended images in an order (e.g., from left to right or from top to bottom), based on the priority of class and/or user preference, based on the designated area of the display 220. According to an embodiment, the processor 120 may control the display 220 to display a captured image (e.g., an original image) and at least one recommended image together.

In operation 1323, the processor 120 may select and store a recommended image. According to an embodiment, when at least one recommended image among the recommended images provided through the display 220 is selected by the user, the processor 120 may store the image, based on the selected recommended image. According to an embodiment, the processor 120 may store the image by applying (or editing) an editing element of the selected recommended image to the captured image. According to an embodiment, when the recommended image is provided through the display 220, the processor 120 may temporarily store a corresponding recommended image, and may also store the temporarily stored recommended image, based on a user selection. According to an embodiment, when storing the recommended image, the processor 120 may store the captured image (e.g., the original image) and the selected recommended image in association with each other according to the configurations of the electronic device 101.

In operation 1325, the processor 120 may update the user preference of the class of the recommended image selected from the database 700. According to an embodiment, the processor 120 may update the user preference of a class related to the selected recommended image among the classes identified in operation 1305. For example, the processor 120 may count (or increase, or accumulate) the number of times (or compensation, weight) of the user preference related to the selected recommended image.

In operation 1327, the processor 120 may estimate an editing element for each user preference, based on a plurality of classes. According to an embodiment, the processor 120 may respectively estimate a plurality of editing element groups related to a user preference in each of the plurality of classes. According to an embodiment, each of the plurality of editing element groups may include one or more editing elements.

In operation 1329, the processor 120 may generate a recommended image for each user preference, based on the estimated editing element. According to an embodiment, the processor 120 may generate a plurality of recommended images respectively corresponding to each class, based on user preference for each class. According to an embodiment, the processor 120 may generate one recommended image for each class, based on user preference for each class.

In operation 1331, the processor 120 may provide a recommended image, based on the priority of the class. According to an embodiment, the processor 120 may provide the recommended images in an order, based on the priority of the class, based on the designated area of the display 220. According to an embodiment, the processor 120 may control the display 220 to display a captured image (e.g., an original image) and at least one recommended image together.

According to an embodiment, after operation 1331, the processor 120 may proceed to operation 1323 and perform operations 1323 and subsequent operations.

In operation 1307, if the identified class corresponds to one (or a single) class (e.g., 'No' in operation 1307), in operation 1341, it may be determined whether a plurality of user preferences are identified based on the identified class (e.g., a single class). For example, the processor 120 may determine whether the corresponding class includes one user preference or a plurality of user preferences.

In operation 1341, when the processor 120 includes a plurality of user preferences in the identified class (e.g., 'Yes' in operation 1341), the processor 120 may proceed to operation 1343 to perform operations 1343 or less. In operation 1341, when one user preference is included in the identified class (e.g., 'No' in operation 1341), the processor 120 may proceed to operation 1355 and perform operations 1355 or less.

In operation 1343, the processor 120 may estimate an editing element for each user preference. According to an embodiment, the processor 120 may estimate a first editing element group related to a first user preference, a second editing element group related to a second user preference, and a third editing element group related to a third user preference. According to an embodiment, each of the first editing element group, the second editing element group, and/or the third editing element group may include one or more editing elements.

In operation 1345, the processor 120 may generate a recommended image for each user preference, based on the estimated editing element. According to an embodiment, the processor 120 may generate a plurality of recommended images respectively corresponding to a plurality of user preferences in a class.

In operation 1347, the processor 120 may determine a recommendation priority for each user preference. According to an embodiment, the processor 120 may determine a priority among a plurality of user preferences. For example, when the class includes three user preferences, the processor 120 may give a higher priority from a user preference having a high preference ratio (or usage ratio) of the user preference, based on the user's usage history related to each user's preference.

In operation 1349, the processor 120 may provide a recommended image based on the priority of the user preference. According to an embodiment, the processor 120 may provide the recommended images in an order (e.g., from left to right or from top to bottom), based on the priority of user preference, based on the designated area of the display 220. According to an embodiment, the processor 120 may control the display 220 to display a captured image (e.g., an original image) and at least one recommended image together.

In operation 1351, the processor 120 may select and store a recommended image. According to an embodiment, when at least one recommended image among the recommended images provided through the display 220 is selected by the user, the processor 120 may store the image, based on the selected recommended image. According to an embodiment, the processor 120 may store the image by applying (or editing) an editing element of the selected recommended image to the captured image. According to an embodiment, when the recommended image is provided through the display 220, the processor 120 may temporarily store a corresponding recommended image, and may also store the temporarily stored recommended image, based on a user selection. According to an embodiment, when storing the recommended image, the processor 120 may store the captured image (e.g., the original image) and the selected recommended image in association with each other according to the configuration of the electronic device 101.

In operation 1353, the processor 120 may update the user preference of the corresponding class in the database 700. According to an embodiment, the processor 120 may update the user preference of the class identified in operation 1305. For example, the processor 120 may count (or increase, or accumulate) the number of times (or compensation, weight) of the user preference related to the selected recommended image.

According to an embodiment, in operation 1351, when a plurality of recommended images among the recommended images provided through the display 220 are selected by the user, the processor 120 may provide the selected order (e.g., priority) through the display 220 (e.g., user interface), and may configure the number of uses (or compensation, weight) of the user preference differently according to the selected order. For example, the processor 120 may configure a count (or increase, accumulation) associated with the selected first image (e.g., a higher priority image) to be higher than a count (or increase or accumulation) associated with the selected second image (e.g., a lower priority image) among the plurality of recommended videos. According to an embodiment, the processor 120 may change (e.g., update) the user preference of the class identified in operation 1305, based on whether the user is selected. For example, in operation 1351, the processor 120 may decrease the number of times (or compensation, weight) of the user preference related to the unselected recommended image.

In operation 1355, the processor 120 may estimate an editing element of the user preference. According to an embodiment, the processor 120 may estimate at least one editing element group related to a user preference in the identified class. According to an embodiment, the at least one editing element group may include one or more editing elements.

In operation 1357, the processor 120 may generate a recommended image of user preference, based on the estimated editing element. According to an embodiment, the processor 120 may generate at least one recommended image, based on a corresponding user preference of a class. According to an embodiment, the processor 120 may estimate the similar preference of the user preference and provide an additional similar preference-based recommended image in addition to the user preference recommended image.

According to an embodiment, after operation 1357, the processor 120 may proceed to operation 1351 to perform operations 1351 and subsequent operations.

Figure 14:
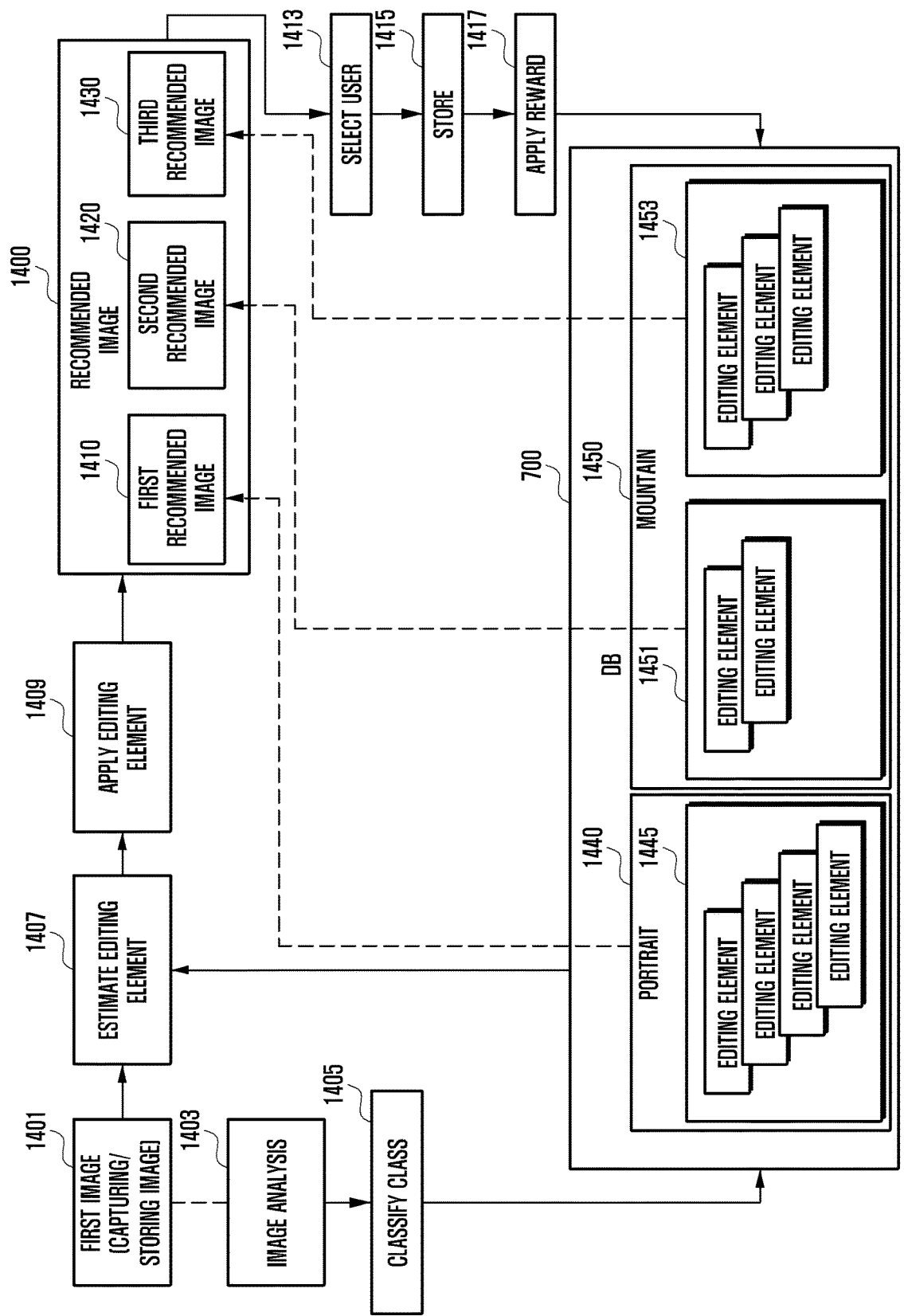
FIG. 14 is a diagram illustrating an example of providing a recommended image and updating a user preference, based on the recommended image in an electronic device according to various embodiments.

FIG. 14 is a diagram illustrating an example of providing a recommended image and updating a user preference, based on the recommended image in an electronic device according to various embodiments.

As shown in FIG. 14, the electronic device 101 may include a database 700 (e.g., the database 231 of FIG. 2). According to an embodiment, the database 700 may correspond to what has been described in the description with reference to FIGS. 7 and/or 9.

According to an embodiment, in the example of FIG. 14, the first class 1440 (e.g., portrait) and the second class 1450 (e.g., mountain) may be used in the database 700 as an example. For example, in FIG. 14, an example of a case in which a class of a target image includes a plurality of classes such as a first class 1440 and a second class 1450, based on image analysis may be illustrated. According to an embodiment, in the example of FIG. 14, the first class 1440 includes one editing element group 1445, and the second class 1450 includes two editing element groups 1451 and 1453, as an example. According to an embodiment, each editing element group 1445, 1451, 1453 may include one or more editing elements.

Referring to FIG. 14, the electronic device 101 may obtain a first image 1401 (e.g., a captured image), based on image capturing. For example, the user may capture an image for the first image 1401 (e.g., a captured image) by using a camera module 180 of the electronic device 101. According to an embodiment, the electronic device 101 may provide an image obtained through the camera module 180 in an image capturing operation as the first image 1401 through a display 220.

According to various embodiments, the electronic device 101 may perform image analysis 1403 for class classification 1405 of the first image 1401, based on the first image 1401. According to an embodiment, the electronic device 101 may identify the class of the first image 1401, based on an analysis algorithm of at least one of scene (or image) classification, object detection, and/or composition detection. According to an embodiment, the electronic device 101 may determine at least one class to which the first image 1401 belongs from among the classes classified in various ways in the database 700. For example, the electronic device 101 may determine, as a class related to the first image 1401, a first class 1440 (e.g., portrait) and a second class 1450 (e.g., mountain) according to the image analysis result.

According to various embodiments, the electronic device 101 may estimate 1407 an editing element for the recommended image 1400, based on the determined classes 1440 and 1450. According to an embodiment, the electronic device 101 may determine a first user preference, based on a first group of editing elements 1445 from a first class 1440 of the database 700 and a second user preference, based on the second editing element group 1451, and the third user preference, based on the third editing element group 1453 from the second class 1450 of the database 700.

According to various embodiments, the electronic device 101 may generate one or more recommended images for each class, based on one or more user preferences for each class. According to an embodiment, the electronic device 101 may detect each editing element for the first user preference, the second user preference, and the third user preference from each editing element group 1445, 1451, 1453 of each class 1440 and 1450, and may generate a recommended image 1400 by applying an editing element to the first image 1401 (1409).

According to an embodiment, the electronic device 101 may apply four editing elements of the first editing element group 1445 to the first image 1401 to generate a first recommended image 1410 related to the user's first user preference. According to an embodiment, the electronic device 101 may apply two editing elements of the second editing element group 1451 to the first image 1401 to generate a second recommended image 1420 related to the user's second user preference. According to an embodiment, the electronic device 101 may apply three editing elements of the third editing element group 1453 to the first image 1401 to generate a third recommended image 1430 related to the user's third user preference.

According to an embodiment, the electronic device 101 may provide at least one recommended image 1400 through the display 220, based on user preference. According to an embodiment, the electronic device 101 may provide a first recommended image 1410 according to the first user preference, a second recommended image 1420 according to the second user preference, and a third recommended image 1430 according to the third user preference, based on the designated area of the display 220. According to an embodiment, the electronic device 101 may provide a first image 1401 (e.g., a captured image) and a recommended image 1400 together.

According to an embodiment, when providing the recommended image 1400, the electronic device 101 may provide the same, based on a priority of a class and/or user preference. According to an embodiment, the electronic device 101 may provide the recommended images 1400 in an order (e.g., from left to right or from top to bottom), based on a priority of a class and/or user preference. For example, referring to the example of FIG. 14, it may be assumed that the first class 1440 has a higher priority than the second class 1450, and the second user preference of the second editing element group 1451 has a higher priority than the third user preference of the third editing element group 1453 in the second class 1450.

In this case, the first recommended image 1410 of the first user preference may have the highest priority (or highest priority) according to the priority of the class, the second recommended image 1420 of the second user preference has a next priority according to the priority of the user preference in the next priority class, and the third recommended image 1430 of the third user preference may have a sequential ranking. According to an embodiment, the electronic device 101 may provide the first recommended image 1410, the second recommended image 1420, and the third recommended image 1430 to a designated area of the display 220 in the order, based on the priority of class and/or user preference.

According to various embodiments, the electronic device 101 may select (1413) and store (1415) a recommended image. According to an embodiment, when at least one recommended image among the recommended images 1400 provided through the display 220 is selected by the user, the electronic device 101 may store the image, based on the selected recommended image. According to an embodiment, the electronic device 101 may store an image by applying (or editing) an editing element of the selected recommended image 1400 to the first image 1401. According to an embodiment, when storing the recommended image, the electronic device 101 may store the first image 1401 (e.g., a captured image) and the selected recommended image 1400 in association with each other according to a configuration of the electronic device 101.

According to various embodiments, the electronic device 101 may update a user preference of a class of a recommended image selected from the database 700. According to an embodiment, assuming that the second recommended image 1420 is selected by the user, the electronic device 101 may apply (1417) a reward to the second user preference of the second class 1450 in the database 700. For example, the electronic device 101 may count (or increase, or accumulate) the number of times (or compensation, weight) of the user preference related to the selected recommended image.

An operation method performed in an electronic device 101 according to various embodiments of the present disclosure may include displaying a preview image through a display 220 (or a display module 160 of FIG. 1) of the electronic device 101, capturing an image, based on at least the preview image, based on a user input while the preview image is displayed, performing image analysis, based on the captured image, identifying at least one class related to the captured image, based on a result of image analysis, identifying at least one user preference, based on the identified class, and providing at least one recommended image related to the at least one user preference through the display 220.

Various embodiments of the present disclosure disclosed in the present specification and drawings are merely provided for specific examples to easily explain the technical content of the present disclosure and help the understanding of the present disclosure, and are not intended to limit the scope of the present disclosure. Therefore, the scope of the present disclosure should be construed as including all changes or modifications derived from the technical spirit of the present disclosure in addition to the embodiments disclosed herein as being included in the scope of the present disclosure.

What is claimed is:

1. An electronic device comprising:
 a camera module;
 a display;
 a processor operatively coupled to the camera module and the display,
 memory storing instructions that, when executed by the processor, cause the electronic device to:
  display a preview image through the display;
  capture an image at least based on the preview image, based on a user input while displaying the preview image;
  perform image analysis, based on the captured image;
  identify at least one class for categorizing a subject of the captured image, based on the result of image analysis;
  identify at least one user preference, based on the identified class, wherein the at least one user preference is determined based on a user's pattern of use of at least one editing element related to editing of the captured image as tracked through a database comprising a usage history of the user; and
  display the captured image and at least one edited image based on the at least one user preference through the display, wherein each edited image is a different image of the captured image, generated by applying at least one editing element based on the at least one user preference.

2. The electronic device of claim 1, wherein the instructions, when executed by the processor, cause the electronic device to analyze an image, based on at least one image analysis algorithm of a scene classifier, object detection, and/or composition detection of the captured image.

3. The electronic device of claim 1, wherein the instructions, when executed by the processor, cause the electronic device to perform the image analysis, based on the captured image in the background at the time of capturing the image.

4. The electronic device of claim 1, wherein the instructions, when executed by the processor, cause the electronic device to:
 display the captured image through a first designated area of the display; and
 display the at least one edited image through a second designated area of the display.

5. The electronic device of claim 1, wherein the instructions, when executed by the processor, cause the electronic device to display one or more edited images, based on the identified at least one class and the at least one user preference clustered in the at least one class, and
 wherein the edited images comprise images edited with editing elements of different user preferences belonging to the same class and/or images edited with editing elements of different user preferences belonging to different classes.

6. The electronic device of claim 1, wherein the instructions, when executed by the processor, cause the electronic device to:
 extract feature vectors by analyzing the contents of the image;
 classify the class of the image, based on the extracted feature vector; and
 call the user preference stored in the classified class to provide the edited image.

7. The electronic device of claim 1, wherein the memory is configured to store the database in which the at least one user preference is tracked for each of various classes related to an image.

8. The electronic device of claim 1, wherein the instructions, when executed by the processor, cause the electronic device to:
 update the corresponding user preference in the selected edited image class, based on detecting the selection of the edited image; and
 count the number of times of use of the user preference related to the selected edited image, in the class.

9. The electronic device of claim 1, wherein the instructions, when executed by the processor, cause the electronic device to:
 apply the editing elements of a selected edited image to a captured image, based on detecting the selection of the edited image; and
 store the captured image and the selected edited image in association with each other.

10. The electronic device of claim 1, wherein the instructions, when executed by the processor, cause the electronic device to:
 update a user preference according to the editing element to a corresponding class where an editing element is configured at a time of taking the image;
 count the number of times the user preference is used where there is a user preference corresponding to the edit element, in the class; and
 generate a new user preference, based on the editing element where there is no user preference corresponding to the editing element in the corresponding class.

11. The electronic device of claim 1, wherein the instructions, when executed by the processor, cause the electronic device to:
 perform image analysis, based on image editing triggers related to image editing;
 classify a class related to an image, based on the result of the image analysis;
 estimate at least one editing element used for editing the image according to the image editing trigger; and
 update the at least one user preference in the database, based at least on the classified class and the estimated editing element.

12. The electronic device of claim 11, wherein the image editing trigger comprises image editing using an editing tool for image editing, capturing configurations while performing capturing, and/or external sharing of the image.

13. The electronic device of claim 1, wherein the instructions, when executed by the processor, cause the electronic device to:
 predict the user preference expected to be executed by the user using a learning model learned using an artificial intelligence algorithm; and predict user preferences that users are expected to execute using a learning model learned using at least one of machine learning, neural network, genetic, deep learning, or classification algorithm, as the artificial intelligence algorithm.

14. An operation method of an electronic device, the method comprising:

displaying a preview image through a display of the electronic device;

capturing an image, based on at least the preview image, based on a user input while the preview image is displayed;

performing image analysis, based on the captured image;

identifying at least one class for categorizing a subject of the captured image, based on a result of image analysis;

identifying at least one user preference, based on the identified class, wherein the at least one user preference is determined based on a user's pattern of use of at least one editing element related to editing of the captured image as tracked through a database comprising a usage history of the user; and displaying the captured image and at least one edited image based on the at least one user preference through the display, wherein each edited image is a different image of the captured image, generated by applying at least one editing element based on the at least one user preference.

15. The method of claim 14, further comprising analyzing an image, based on at least one image analysis algorithm of a scene classifier, object detection, and/or composition detection of the captured image.

16. The method of claim 14, further comprising displaying one or more edited images, based on the identified at least one class and the at least one user preference clustered in the at least one class, and wherein the edited images comprise images edited with editing elements of different user preferences belonging to the same class and/or images edited with editing elements of different user preferences belonging to different classes.

17. The method of claim 14, further comprising:

updating the corresponding user preference in the selected edited image class, based on detecting the selection of the edited image; and counting the number of times of use of the user preference related to the selected edited image, in the class.

18. A non-transitory computer-readable storage medium storing instructions that, when executed by a processor, cause the processor to perform the operating method of the electronic device of claim 14.

* * * * *